(12) United States Patent
Schwan et al.

(10) Patent No.: US 7,513,866 B2
(45) Date of Patent: Apr. 7, 2009

(54) INTESTINE PROCESSING DEVICE AND ASSOCIATED METHOD

(75) Inventors: Wade E. Schwan, Warsaw, IN (US); Philip J. Jenks, Warsaw, IN (US); Dawn M. Fisher, Warsaw, IN (US)

(73) Assignee: DePuy Products, Inc., Warsaw, IN (US)

( * ) Notice: Subject to any disclaimer, the term of this patent is extended or adjusted under 35 U.S.C. 154(b) by 767 days.

(21) Appl. No.: 10/977,171

(22) Filed: Oct. 29, 2004

(65) Prior Publication Data
US 2006/0128296 A1    Jun. 15, 2006

(51) Int. Cl.
*A61F 2/04*     (2006.01)
*A22C 13/00*    (2006.01)

(52) U.S. Cl. .................. 600/36; 452/123; 452/173

(58) Field of Classification Search ............... 600/36; 452/123, 173; 15/93.1; 424/423; 623/23.64–23.76
See application file for complete search history.

(56) References Cited

U.S. PATENT DOCUMENTS

| | | | |
|---|---|---|---|
| 2,526,449 A * | 10/1950 | Arlow et al. ........... 452/123 |
| 3,272,204 A | 9/1966 | Artandi et al. | |
| 3,562,820 A | 2/1971 | Braun | |
| 4,352,463 A | 10/1982 | Baker | |
| 4,400,833 A | 8/1983 | Kurland | |
| 4,418,691 A | 12/1983 | Yannas et al. | |
| 4,642,120 A | 2/1987 | Nevo et al. | |
| 4,703,108 A | 10/1987 | Silver et al. | |
| 4,873,976 A | 10/1989 | Schreiber | |
| 4,880,429 A | 11/1989 | Stone | |
| 4,902,508 A | 2/1990 | Badylak et al. | |
| 4,919,667 A | 4/1990 | Richmond | |
| 4,956,178 A | 9/1990 | Badylak et al. | |
| 4,956,179 A | 9/1990 | Bamberg et al. | |
| 4,976,715 A | 12/1990 | Bays et al. | |
| 5,007,934 A | 4/1991 | Stone | |
| 5,061,286 A | 10/1991 | Lyle | |
| 5,102,421 A | 4/1992 | Anspach, Jr. | |
| 5,108,438 A | 4/1992 | Stone | |
| 5,128,326 A | 7/1992 | Balazs et al. | |
| 5,236,431 A | 8/1993 | Gogolewski et al. | |
| 5,246,441 A | 9/1993 | Ross et al. | |
| 5,275,826 A | 1/1994 | Badylak et al. | |
| 5,281,422 A | 1/1994 | Badylak et al. | |
| 5,306,311 A | 4/1994 | Stone et al. | |
| 5,320,633 A | 6/1994 | Allen et al. | |

(Continued)

OTHER PUBLICATIONS

Aigner et al., "Collagens-major component of the physiological cartilage matrix, major target of cartilage degeneration, major tool on cartilage repair", *Advanced Drug Delivery Reviews*, vol. 55, No. 12, 2003, pp. 1569-1593.

(Continued)

*Primary Examiner*—John P Lacyk

(57) ABSTRACT

A device for preparing small intestines of a vertebre is provided. The device includes a body for cooperation with the small intestines. The body defines an external periphery of the body. The device further includes means for longitudinally slitting the small intestines. The means for longitudinally slitting the small intestines is operably associated with the body. The device further includes means for despooging the small intestines in juxtaposition with said body.

42 Claims, 20 Drawing Sheets

U.S. PATENT DOCUMENTS

| | | | |
|---|---|---|---|
| 5,350,583 A | 9/1994 | Yoshizato et al. |
| 5,352,463 A | 10/1994 | Badylak et al. |
| 5,372,821 A | 12/1994 | Badylak et al. |
| 5,374,268 A | 12/1994 | Sander |
| 5,376,118 A | 12/1994 | Kaplan et al. |
| 5,380,334 A | 1/1995 | Torrie et al. |
| 5,445,833 A | 8/1995 | Badylak et al. |
| 5,447,940 A | 9/1995 | Harvey et al. |
| 5,460,962 A | 10/1995 | Kemp |
| 5,479,033 A | 12/1995 | Baca et al. |
| 5,514,181 A | 5/1996 | Light et al. |
| 5,516,533 A | 5/1996 | Badylak et al. |
| 5,554,389 A | 9/1996 | Badylak et al. |
| 5,569,252 A | 10/1996 | Justin et al. |
| 5,573,784 A | 11/1996 | Badylak et al. |
| 5,591,234 A | 1/1997 | Kirsch |
| 5,593,441 A | 1/1997 | Lichtenstein et al. |
| 5,595,621 A | 1/1997 | Light et al. |
| 5,601,558 A | 2/1997 | Torrie et al. |
| 5,632,745 A | 5/1997 | Schwartz |
| 5,641,518 A | 6/1997 | Badylak et al. |
| 5,645,860 A | 7/1997 | Knapp, Jr. et al. |
| 5,660,225 A | 8/1997 | Saffran |
| 5,668,288 A | 9/1997 | Chinh et al. |
| 5,669,912 A | 9/1997 | Spetzler |
| 5,677,355 A | 10/1997 | Shalaby et al. |
| 5,681,353 A | 10/1997 | Li et al. |
| 5,693,085 A | 12/1997 | Buirge et al. |
| 5,695,998 A | 12/1997 | Badylak et al. |
| 5,702,462 A | 12/1997 | Oberlander |
| 5,711,969 A | 1/1998 | Patel et al. |
| 5,730,933 A | 3/1998 | Peterson |
| 5,733,337 A | 3/1998 | Carr, Jr. et al. |
| 5,733,868 A | 3/1998 | Peterson et al. |
| 5,735,897 A | 4/1998 | Buirge |
| 5,735,903 A | 4/1998 | Li et al. |
| 5,753,267 A | 5/1998 | Badylak et al. |
| 5,755,791 A | 5/1998 | Whitson et al. |
| 5,759,190 A | 6/1998 | Vibe-Hansen et al. |
| 5,759,205 A | 6/1998 | Valentini |
| 5,759,208 A | 6/1998 | Zhen et al. |
| 5,762,966 A | 6/1998 | Knapp, Jr. et al. |
| 5,769,899 A | 6/1998 | Schwartz et al. |
| 5,773,577 A | 6/1998 | Cappello |
| 5,788,625 A | 8/1998 | Plouhar et al. |
| 5,795,353 A | 8/1998 | Felt |
| 5,800,537 A | 9/1998 | Bell |
| 5,820,453 A * | 10/1998 | Burke .......................... 452/123 |
| 5,830,708 A | 11/1998 | Naughton |
| 5,834,232 A | 11/1998 | Bishop et al. |
| 5,842,477 A | 12/1998 | Naughton et al. |
| 5,847,012 A | 12/1998 | Shalaby et al. |
| 5,855,613 A | 1/1999 | Antanvich et al. |
| 5,855,619 A | 1/1999 | Caplan et al. |
| 5,863,551 A | 1/1999 | Woerly |
| 5,866,414 A | 2/1999 | Badylak et al. |
| 5,885,619 A | 3/1999 | Patel et al. |
| 5,899,939 A | 5/1999 | Boyce et al. |
| 5,916,265 A | 6/1999 | Hu |
| 5,922,028 A | 7/1999 | Plouhar et al. |
| 5,954,723 A | 9/1999 | Spetzler |
| 5,954,747 A | 9/1999 | Clark |
| 5,955,110 A | 9/1999 | Patel et al. |
| 5,958,874 A | 9/1999 | Clark et al. |
| 5,968,096 A | 10/1999 | Whitson et al. |
| 5,971,987 A | 10/1999 | Huxel et al. |
| 5,980,524 A | 11/1999 | Justin et al. |
| 5,981,802 A | 11/1999 | Katz |
| 5,981,825 A | 11/1999 | Brekke |
| 5,989,269 A | 11/1999 | Vibe-Hansen et al. |
| 5,989,280 A | 11/1999 | Euteneuer et al. |
| 5,993,475 A | 11/1999 | Lin et al. |
| 5,993,844 A | 11/1999 | Abraham et al. |
| 5,997,575 A | 12/1999 | Whitson et al. |
| 6,017,348 A | 1/2000 | Hart et al. |
| 6,027,744 A | 2/2000 | Vacanti et al. |
| 6,042,610 A | 3/2000 | Li et al. |
| 6,051,750 A | 4/2000 | Bell |
| 6,056,752 A | 5/2000 | Roger |
| 6,056,777 A | 5/2000 | McDowell |
| 6,056,778 A | 5/2000 | Grafton et al. |
| 6,060,640 A | 5/2000 | Pauley et al. |
| 6,068,648 A | 5/2000 | Cole et al. |
| 6,077,989 A | 6/2000 | Kandel et al. |
| 6,080,194 A | 6/2000 | Pachence et al. |
| 6,093,201 A | 7/2000 | Cooper et al. |
| 6,096,347 A | 8/2000 | Geddes et al. |
| 6,099,567 A | 8/2000 | Badylak et al. |
| 6,110,212 A | 8/2000 | Gregory |
| 6,126,686 A | 10/2000 | Badylak et al. |
| 6,146,385 A | 11/2000 | Torrie et al. |
| 6,152,935 A | 11/2000 | Kammerer et al. |
| 6,153,292 A | 11/2000 | Bell et al. |
| 6,156,044 A | 12/2000 | Kammerer et al. |
| 6,165,225 A | 12/2000 | Antanavich et al. |
| 6,171,344 B1 | 1/2001 | Atala |
| 6,176,880 B1 | 1/2001 | Plouhar et al. |
| 6,179,840 B1 | 1/2001 | Bowman |
| 6,179,872 B1 | 1/2001 | Bell et al. |
| 6,187,039 B1 | 2/2001 | Hiles et al. |
| 6,206,931 B1 | 3/2001 | Cook et al. |
| 6,214,049 B1 | 4/2001 | Gayer et al. |
| 6,224,892 B1 | 5/2001 | Searle |
| 6,235,057 B1 | 5/2001 | Roger et al. |
| 6,242,247 B1 | 6/2001 | Rieser et al. |
| 6,251,143 B1 | 6/2001 | Schwartz et al. |
| 6,251,876 B1 | 6/2001 | Bellini et al. |
| 6,258,124 B1 | 7/2001 | Darois et al. |
| 6,264,702 B1 | 7/2001 | Ory et al. |
| 6,265,333 B1 | 7/2001 | Dzenis et al. |
| 6,270,530 B1 | 8/2001 | Eldridge et al. |
| 6,273,893 B1 | 8/2001 | McAllen, III et al. |
| 6,280,473 B1 | 8/2001 | Lemperle et al. |
| 6,283,980 B1 | 9/2001 | Vibe-Hansen et al. |
| 6,288,043 B1 | 9/2001 | Spiro et al. |
| 6,290,711 B1 | 9/2001 | Caspari et al. |
| 6,293,961 B2 | 9/2001 | Schwartz et al. |
| 6,294,041 B1 | 9/2001 | Boyce et al. |
| 6,306,156 B1 | 10/2001 | Clark |
| 6,306,159 B1 | 10/2001 | Schwartz et al. |
| 6,306,177 B1 | 10/2001 | Felt et al. |
| 6,319,258 B1 | 11/2001 | McAllen, III et al. |
| 6,319,271 B1 | 11/2001 | Schwartz et al. |
| 6,326,025 B1 | 12/2001 | Sigler et al. |
| 6,333,029 B1 | 12/2001 | Vyakarnam et al. |
| 6,334,872 B1 | 1/2002 | Termin et al. |
| 6,355,699 B1 | 3/2002 | Vyakarnam et al. |
| 6,358,284 B1 | 3/2002 | Fearnot et al. |
| 6,364,884 B1 | 4/2002 | Bowman et al. |
| 6,371,958 B1 | 4/2002 | Overaker |
| 6,373,221 B1 | 4/2002 | Koike et al. |
| 6,379,367 B1 | 4/2002 | Vibe-Hansen et al. |
| 6,379,710 B1 | 4/2002 | Badylak |
| 6,383,221 B1 | 5/2002 | Scarborough et al. |
| 6,387,693 B2 | 5/2002 | Rieser et al. |
| 6,409,764 B1 | 6/2002 | White et al. |
| 6,440,444 B2 | 8/2002 | Boyce et al. |
| 6,451,032 B1 | 9/2002 | Ory et al. |
| 6,458,158 B1 | 10/2002 | Anderson et al. |
| 6,458,383 B2 | 10/2002 | Chen et al. |
| 6,464,729 B1 | 10/2002 | Kandel |
| 6,497,650 B1 | 12/2002 | Nicolo |
| 6,517,564 B1 | 2/2003 | Grafton et al. |
| 6,572,650 B1 | 6/2003 | Abraham et al. |

| | | | |
|---|---|---|---|
| 6,592,623 B1 | 7/2003 | Bowlin et al. | |
| 6,638,312 B2 | 10/2003 | Plouhar et al. | |
| 6,652,872 B2 | 11/2003 | Nevo et al. | |
| 6,666,892 B2 | 12/2003 | Hiles et al. | |
| 6,692,499 B2 | 2/2004 | Tormala et al. | |
| 6,696,270 B2 | 2/2004 | Badylak et al. | |
| 6,812,221 B2 | 11/2004 | McKeehan et al. | |
| 2001/0024658 A1 | 9/2001 | Chen et al. | |
| 2001/0036806 A1* | 11/2001 | Burke | 452/123 |
| 2001/0043943 A1 | 11/2001 | Coffey | |
| 2002/0019649 A1 | 2/2002 | Sikora et al. | |
| 2002/0038151 A1 | 3/2002 | Plouhar et al. | |
| 2002/0048595 A1 | 4/2002 | Geistlich et al. | |
| 2002/0099448 A1 | 7/2002 | Hiles et al. | |
| 2002/0173806 A1 | 11/2002 | Giannetti et al. | |
| 2003/0014126 A1 | 1/2003 | Patel et al. | |
| 2003/0021827 A1 | 1/2003 | Malaviya et al. | |
| 2003/0023316 A1 | 1/2003 | Brown | |
| 2003/0032961 A1 | 2/2003 | Pelo et al. | |
| 2003/0033021 A1 | 2/2003 | Plouhar et al. | |
| 2003/0033022 A1 | 2/2003 | Plouhar et al. | |
| 2003/0036797 A1 | 2/2003 | Malaviya et al. | |
| 2003/0036801 A1 | 2/2003 | Schwartz et al. | |
| 2003/0040267 A1* | 2/2003 | Houtz et al. | 452/123 |
| 2003/0044444 A1 | 3/2003 | Malaviya et al. | |
| 2003/0049299 A1 | 3/2003 | Malaviya et al. | |
| 2003/0212447 A1 | 11/2003 | Euteneuer et al. | |

OTHER PUBLICATIONS

Aiken et al., "Small Intestinal Submucosa as an Intra-Articular Ligamentous Graft Material: A Pilot Study in Dogs", *Vet Comp Orthopedics Traumatology*, 7:124-128, (1994).

Allman et al., "The Th2-Restricted Immune Response to Xenogeneic Small Intestinal Submucosa Does Not Influence Systemic Protective Immunity to Viral and Bacterial Pathogens", *Tissue Engineering*, vol. 8, No. 1, 2002, pp. 53-62.

Allman et al., Xenogeneic Extracellular Matrix Grafts Elicit a Th2-Restricted Immune Response, *Transplantation*, vol. 71, No. 11, Jun. 15, 2001, pp. 1631-1640.

Answers.com,. Definition of "freeze-dry", Accessed on May 12, 2005, 6 pgs.

Badylak, et al., "Different Configurations of Small Intestinal Submucosa as a Biomaterial for Achilles Tendon Repair in a Dog Model," *First SIS Symposium*, Dec. 1996, USA.

Badylak , S., et al., "Naturally Occurring Extracellular Matrix as a Scaffold for Musculoskeletal Repair", *Clin Orthop*, 3675:S333-S3433, (1999).

Badylak et al., "The Use of Xenogeneic Small Intestinal Submucosa as a Biomaterial for Achille's Tendon Repair in a dog model", *J Biomed Materials*, 29:977-985, (1995).

Biscarini et al., "Growth of High Vacuum Sublimed Oligomer Thin Films", *ACS Polymer Preprints*, vol. 37, No. 2, 1996, pp. 618-619.

Biscarini et al., "Morphology and roughness of high-vacuum sublimed oligomer thin films", *Thin Solid Films*, vol. 439-443, 1996, pp. 284-285.

Biscarini et al., "Scaling Behavior of Anisotropic Organic Thin Films Grown in High-Vacuum", *Physical Review Letters*, vol. 78, No. 12, Mar. 24, 1997, pp. 2389-2392.

"Current Clinical Applications of SIS," *Third SIS Symposium*, Nov. 2000, USA.

Clarke et al., "Intestine Submucosa and Polypropylene Mesh for Abdominal Wall Repair in Dogs", *J Surg Res*, 60:107-114, (1996).

Cobb et al., "Histology after Dural Grafting with Small Intestinal Submucosa", *Surgical Neurology*, 46: 389-394, (1996).

Cobb et al., "Porcine Small Intestinal Submucosa as a Dural Substitute", *Surgical Neurology*, 51:99-104, (1999).

Cook, et al., "Comparison of SIS Cancellous Bone as Substrates for Three-Dimensional Culture of Canine Articular Chondrocytes," *First SIS Symposium*, Dec. 1996, USA.

Cook, J.L. et al., "Induction of Meniscal Regeneration in Dogs Using a Novel Biomaterial", *AM J Sports Med*, 27: 658, (1999).

Cook, et al., "Meniscal Regeneration in dogs Using Grafts of SIS," *Second SIS Symposium*, Dec. 1998, USA.

Cook, et al., "Tissue Engineering For Meniscal Repair Using SIS," *Third SIS Symposium*, Nov. 2000, USA.

Cook® News Releases, "Cook Incorporated Forms Dedicated Tissue Engineered Products Group", (Feb. 16, 2000).

Cook® News Releases, "Cook® Introduces Innovative Surgisis™ Soft Tissue Repair Biomaterial", (May 21, 2000).

Cook® News Releases, "Cook® Oasis™ Wound Dressing Biomaterial From Cook® Remodels Partial Thickness Skin Injuries", (Dec. 23, 1999).

Cook® News Releases, "FDA Clears Oasis™ Wound Dressing Biomaterial From Cook® For Full-Thickness Skin Injuries", (Jan. 24, 2000).

Dejardin, L.M. et al., "Use of small intestinal submucosal implants for regeneration of large fascial defects: an experimental study in dogs", *J Biomed Mater Res*, 46:203-211, (1999).

Ferrand et al., "Directional Porosity of Porcine Small-Intestinal Submucosa", *J Biomed Materials Res*, 27:1235-1241, (1993).

Friess, "Collagen in drug delivery and tissue engineering", *Advanced Drug Delivery Reviews*, vol. 55, No. 12, 2003, pp. 1529-1530.

Geiger et al., "Collagen sponges for bone regeneration with rhBMP-2", *Advanced Drug Delivery Reviews*, vol. 55, No. 12, 2003, pp. 1613-1629.

Hiles et al., "Mechanical properties of xenogeneic small-intestinal submucosa when used as an aortic graft in the dog", *Journal of Biomedical Materials Research*, vol. 29, 883-891, (1995).

Hiles et al., "Porosity of Porcine Small-Intestinal Submucosa for use a Vascular Graft", *J Biomed Materials Res*, 27: 139-144, (1993).

Hodde et al., "Fibronectin peptides mediate HMEC adhesion to porcine-derived extracellular matrix", *Biomaterials*, vol. 23, 2002, pp. 1841-1848.

Hodde et al., "Glycosaminoglycan Content of Small Intestinal Submucosa: A Bioscaffold for Tissue Replacement", *Tissue Engineering*, 2:3, 209-217, (1996).

Hodde, et al., "Glycosaminoglycan Content of Small Intestinal Submucosa: A Potential for GAG-Growth Interactions in SIS-Mediated Healing", *First Symposium*, Dec. 1996, USA.

Hodde, "Naturally Occurring Scaffolds for Soft Tissue Repair and Regeneration", *Tissue Engineering*, vol. 8, No. 2, 2002, pp. 295-308.

Hodde et al., "The Effect of Range of Motion Upon Remodeling of Small Intestinal Submucosa (SIS) when used as an Achilles Tendon Repair Material in the Rabbit", *Tissue Engineering*3, 1:27-37, (1997).

Hodde, et al., "Vascular Endothelial Growth Factor in Porcine-Derived Extracellular Matrix", *Endothelium*, vol. 8(1), 2001, pp. 11-24.

Hodde et al., "Wounds: A Compendium of Clinical Research and Practice", *Website*: http:www.hmpcommunications.com/WNDS, Printed: Jul. 12, 2005, 7 pgs.

Hoffman, "SIS Disc Replacement For the Temporomandibular Joint," *Third SIS Symposium*, Nov. 2000, USA.

Hurst et al., "Mapping of the distribution of significant proteins and proteoglycans in small intestinal submucosa by fluorescence microscopy", *J. Biomater. Sci. Polymer Edn*., vol. 12, No. 11, 2001, pp. 1267-1279.

Kaeding, "Use of SIS In The Surgical Treatment of Chronic Symptomatic Patella Tendinosis," *Third SIS Symposium*, Nov. 2000, USA.

Kandel, et al., "SIS and Reconstituted Cartilage and Its Use in Joint Resurfacing of Focal Defects in Rabbits," *First SIS Symposium*, Dec. 1996, USA.

Klawitter et al., "An Evaluation of Bone Growth into Porous High Density Polyethylene", *J. Biomed. Materials Res*., vol. 10 (1976) pp. 311-323.

Klootwyk, et al., "The Use of Xenographic SIS as a Biomaterial for Achilles Tendon Repair in Dogs," *First SIS Symposium*, Dec. 1996, USA.

Knapp, et al., "Biocompatibility of Small-Intestine Submucosa in Urinary Tract as Augmentation Cystoplasty Graft and Injectable Suspension", *J Endourology*, 8:125-130, (1994).

Krőma, "Nonwoven Textiles", *Textile Trade Press*, Manchester, England, 1962, 6 pgs.

Kropp et al, Characterization of Small Intestinal Submucosa Regenerated Canine Detrusor: Assessment of Reinnervation, In Vitro Compliance and contractility, *J. of Urol*, 156:599-607, (1996).

Kropp et al., "Experimental Assessment of Small Intestinal Submucosa as a Bladder Wall Substitute", *Urology* 446:369-400, (1995).

Kropp et al., "Regenerative Bladder Augmentation: A Review of the Initial Preclinical Studies with Porcine Small Intestinal Submucosa", *Muscle Matrix, and Bladder Function*. Plenum. Press, New York, (1995).

Kropp et al., "Regenerative Urinary Bladder Augmentation Using Small Intestinal Submucosa: Urodynamic and Histopathologic Assessment in Long-Term Canine Bladder Augmentations", *Journal of Urology*, 155:2098-2104, (1996).

Lenz, et al., "SIS as an ACL Replacement in Dogs and Goats," *First Symposium*, Dec., 1996, USA.

Lifrak, et al., "Enhanced Repair of Goat Meniscal Defects Using Porcine Small Intestinal Submucosa (SIS), "*Third SIS Symposium*, Nov., 2000, USA.

Ma et al., "Biodegradable Polymer Scaffolds with Well-Defined Interconnected Spherical Pore Network", *Tissue Engineering*, vol. 7, No. 1, 2001, pp. 23-33.

Ma et al.,. "Microtubular architecture of biodegradable polymer scaffolds", *J. Biomed. Materials Res.*, vol. 56, No. 4, 2001, pp. 469-477.

Matthews et al., "Electrospinning of Collagen Type II: Feasibility Study", *Journal of Bioactive and Compatible Polymers*, vol. 18, Mar. 2003, pp. 125-134.

McPherson, Ph.D. et al., "Characterization of Fibronectin Derived from Porcine Small Intestinal Submucosa", *Tissue Engineering*, vol. 4, No. 1, 1998, pp. 75-83.

Moore, et al., "Bridging Segmental Defects In Long Bones With Intramedullary Tubes And Periosteal Sleeves Made From Small Intestinal Submucosa (SIS)," *Third SIS Symposium*, Nov. 2000, USA.

Nehrer et al., "Matrix collagen type and pore size influence behavior of seeded canine chondrocytes", *Biomaterials*, vol. 18, No. 11, 1997, pp. 769-776.

Obermiller, et al., "Suture Retention Strength of SIS," *First SIS Symposium*, Dec. 1996, USA.

O'Grady et al., "Global regulatory registration requirements for collagen-based combination products: points to consider", *Advanced Drug Delivery Reviews*, vol. 55, No. 12, 2003, pp. 1699-1721.

Ojha, et al., "PGA-Plla Versus Small Intestinal Submucosa (SIS): A Comparison of Neo-Cartilage Grown Two Scaffold Materials," *Third SIS Symposium*, Nov. 2000, USA.

Olsen et al., "Recombinant collagen and gelatin for drug delivery", *Advanced Drug Delivery Reviews* vol. 55, No. 12, 2003, pp. 1547-1567.

Paulino, et al., "The Use of an SIS-PGA Composite Graft for Repair of Cartilage Defect," Dec. 1998, USA.

Prevel et al., "Small Intestinal Submucosa: Utilization for Repair of Rodent Abdominal Wall Defects", *Ann Plast Surg*, 35:374-380, (1995).

Prevel et al., "Small Intestinal Submucosa: Utilization as a Wound Dressing in Full-Thickness Rodent Wounds", *Ann Plast Surg.* 35:381-388, (1995).

Ruszczak et al., "Collagen as a carrier for on-site delivery of antibacterial drugs", *Advanced Drug Delivery Reviews*, vol. 55, No. 12, 2003, pp. 1679-1698.

Sacks, M.S., et al., "Quantification of the fiber architecture and biaxial mechanical behavior of porcine intestinal submucosa", J Biomed Mater Res, 46:1-10 (1999).

Salem et al., "Interactions of 3T3 fibroblasts and endothelial with defined pore ffeatures", J. Biomed Materials Res., vol. 61, No. 2, 2002, pp. 212-217.

Sandusky, et al., "Healing Comparison of Small Intestine Submucosa and ePTFE Grafts in the Canine Carotid Artery", J. Surg.Res., 58:415-420, (1995).

Shelton, et al., "Repair of the Canine Medial Meniscus using SIS: A Feasibility Study," *Second SIS Symposium*, Dec. 1998, USA.

Shors, Coralline Bone Graft Substitutes, *Orthopaedic Clinics of North America*, Bone Grafting and Bone Graft Substitutes, vol. 30, No. 4, Oct. 1999, pp. 599-613.

"Small Intestinal Submucosa," Third SIS Symposium, Nov. 2000, USA.

Solchaga, et al., "SIS as Delivery Vehicle for Mesenchymal Progenitor Cells," Dec. 1998, USA.

Suckow, M.A., "Enhanced Bone Regeneration Using Porcine Small Intestinal Submucosa", *J. Invest Surg*, 12:277, (1999).

Tomczak and Kaeding, "Use of SIS in The Surgical Treatment of Tendinosis About The Foot And Ankle," *Third SIS Symposium*, Nov. 2000, USA.

Tomasek and Gifford, "Small Intestinal Submucosa Matrix Regulates The Differentiation of Myofibroblasts," *Third SIS Symposium*, Nov. 2000, USA.

Toombs and May, "Clinical Follow-Up of Three Canine ACL Reconstructions Using an SIS ACL Device," Dec. 1998, USA.

Tullius, et al., "Differential Permeabilty of SIS," *First SIS Symposium*, Dec. 1996, USA.

Vaught et al., "Detrusor Regeneration in the Rat Using Porcine Small Intestinal Submucosa Grafts: Functional Innervation and Receptor Expression", *J. Urol.*, 155:374-378, (1996).

Voytik-Harbin et al., "Application and Evaluation of the AlamarBlue Assay for Cell Growth and Survival of Fibroblasts", *Journal of Immunological Methods, In Vitro Cell Bio-Animal*, 34:2399-246, (1998).

Voytik-Harbin & Badylak, "Induction of Osteogenic Activity By Small Intestinal Submucosa in Rat Calvaria Non-union Defects," *First SIS Symposium*, Dec. 1996, USA.

Welch, et al., "Healing of Canine Meniscal Defect with Small Intestinal Submucosa Implants," Dec. 1998, USA.

Voytik-Harbin et al., "Identification of Extractable Growth Factors from Small Intestinal Submucosa", *Journal of Cellular Biochemistry*, vol. 67, 1997, pp. 478-491.

Wang, Experimental Study of Osteogenic Activity of Sintered Hydroxyapatite—On the Relationship of Sintering Temperature and Pore Size—, *J. Jpn. Orthop. Assoc.*, vol. 64, 1990, pp. 847-859.

Wang, et al., "Small Intestinal Submucosa Enhances Healing of Medical Collateral Ligament In A Rabbit Model," *Third SIS Symposium*, Nov. 2000, USA.

Wiklerson, "Use of The Porcine Small Intestine Submucosal Tissue Graft And Repair of Rotator Cuff Tears," *Third SIS Symposium*, Nov. 2000, USA.

White et al., "Biomaterial Aspects of Interpore-200 Porous Hydroxyapatite", *Dental Clinics of North America*, Reconstructive Implant Surgery and Implant Prosthodontics 1, vol. 30, No. 1, pp. 49-67.

* cited by examiner

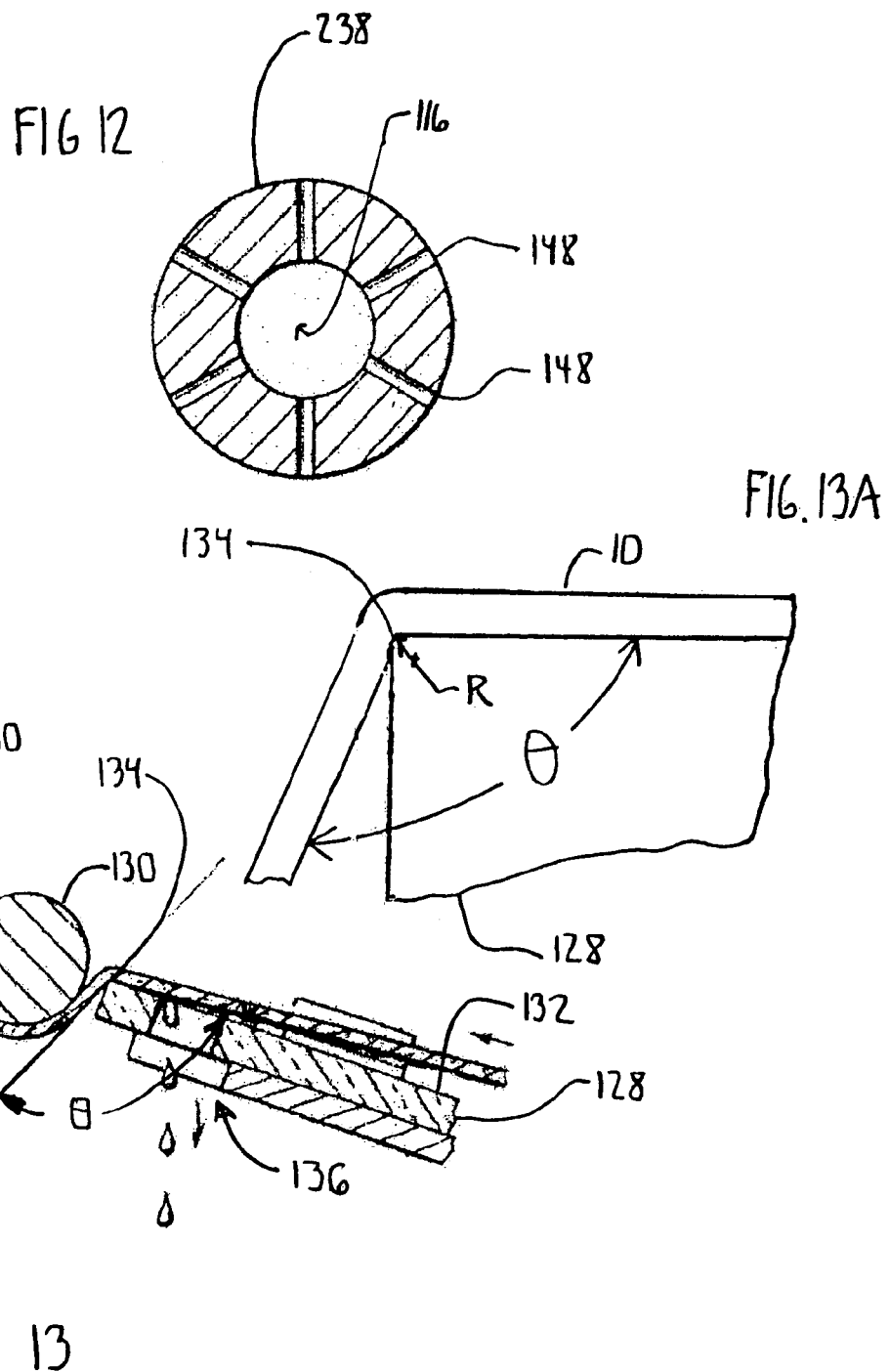

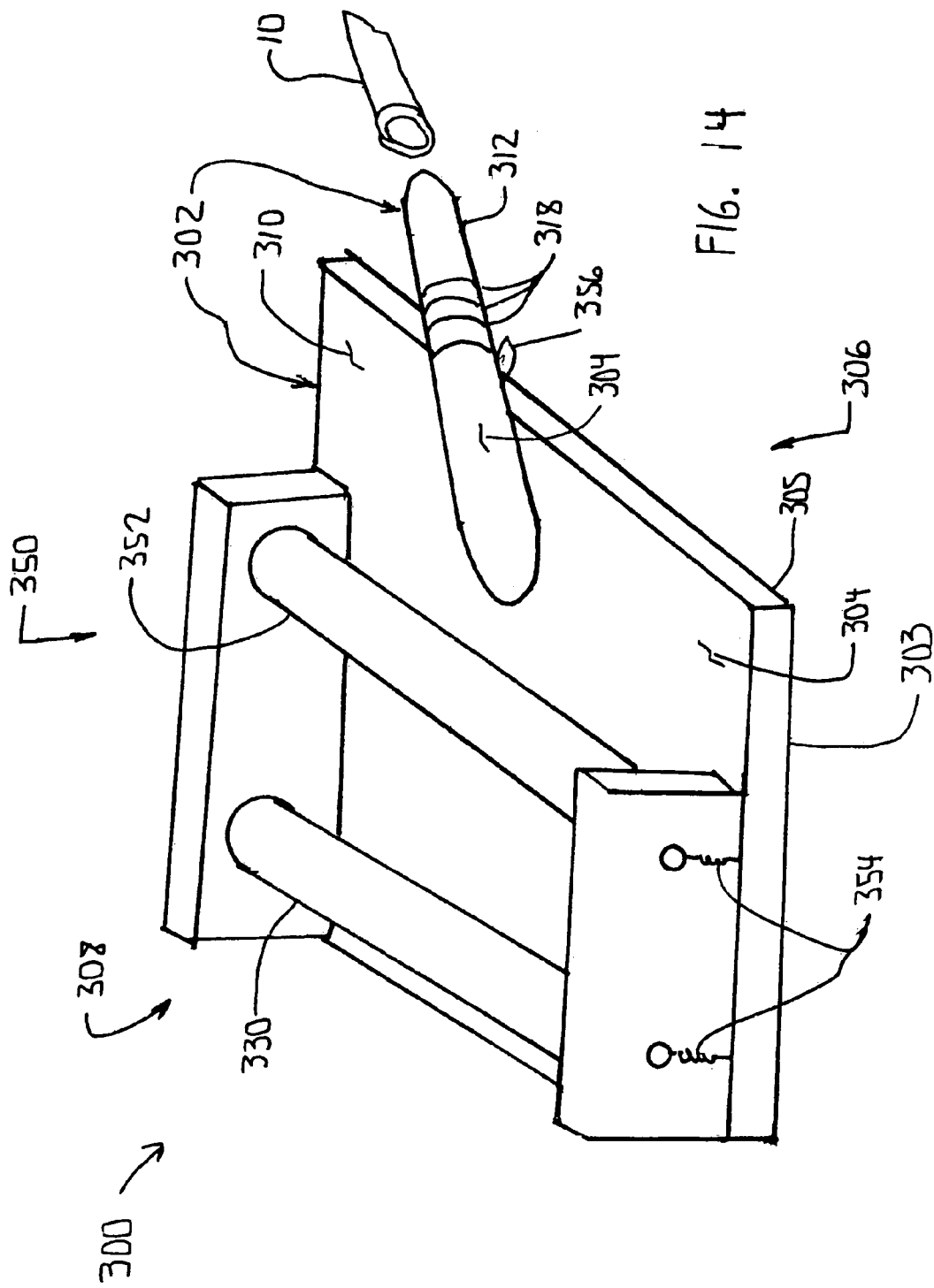

INTESTINE PROCESSING DEVICE AND ASSOCIATED METHOD

TECHNICAL FIELD OF THE INVENTION

The present invention relates to a device and a method to prepare intestinal tissue derived tissue grafts for use in repairing damaged or diseased tissues. More particularly, this invention is directed to a device and a method to prepare intestinal submucosal tissue grafts.

BACKGROUND OF THE INVENTION

The present invention is directed to a device and a method of preparing vertebrae submucosa-derived collagenous matrices in combination with pre-selected cell population as tissue graft construct for the use in the repair of damaged or diseased tissues. The collagenous matrices for use in accordance with the present invention comprise highly conserved collagens, glycoproteins, proteoglycans, and glycosaminoglycans in their natural configuration and natural concentration. The extracellular collagenous matrix for use in this invention is derived from submucosal tissue of a warm-blooded vertebrae.

In accordance with the present invention the submucosa is isolated from warm-blooded vertebrae tissues including the alimentary, respiratory, intestinal, urinary or genital tracts of warm-blooded vertebraes. The preparation of intestinal submucosa is described and claimed in U.S. Pat. No. 4,902,508, the disclosure of which is expressly incorporated herein by reference. Urinary bladder submucosa and its preparation are described in U.S. Pat. No. 5,554,389, the disclosure of which is expressly incorporated herein by reference.

Stomach submucosa has also been obtained and characterized using similar tissue processing techniques. Such is described in U.S. Pat. No. 6,696,270 titled GASTRIC SUBMUCOSAL TISSUE AS A NOVEL DIAGNOSTIC TOOL issued Feb. 24, 2004. Briefly, stomach submucosa is prepared from a segment of stomach in a procedure similar to the preparation of intestinal submucosa. A segment of stomach tissue is first subjected to abrasion using a longitudinal wiping motion to remove the outer layers (particularly the smooth muscle layers and the luminal portions of the tunica mucosa layers. The resulting submucosa tissue has a thickness of about 100 to about 200 micrometers, and consists primarily (greater than 98%) of a cellular, eosinophilic staining (H&E stain) extracellular matrix material.

Preferred submucosal tissues for use in accordance with this invention include intestinal submucosa, stomach submucosa, urinary bladder submucosa, and uterine submucosa. Intestinal submucosal tissue is one preferred starting material, and more particularly intestinal submucosa delaminated from both the tunica muscularis and at least the tunica mucosa of warm-blooded vertebrae intestine.

As a tissue graft, submucosal tissue undergoes remodeling and induces the growth of endogenous tissues upon implantation into a host. It has been used successfully in vascular grafts, urinary bladder and hernia repair, replacement and repair of tendons and ligaments, and dermal grafts. The preparation and use of submucosa as a tissue graft composition is described in U.S. Pat. Nos. 4,902,508; 5,281,422; 5,275,826; 5,554,389; and other related U.S. patents. When used in such applications the graft constructs appear not only to serve as a matrix for the regrowth of the tissues replaced by the graft constructs, but also promote or induce such regrowth of endogenous tissue. Common events to this remodeling process include: widespread and very rapid neovascularization, proliferation of granulation mesenchymal cells, biodegradation/resorption of implanted intestinal submucosal tissue material, and lack of immune rejection. The use of submucosal tissue in sheet form and fluidized forms for inducing the formation of endogenous tissues is described and claimed in U.S. Pat. Nos. 5,281,422 and 5,275,826, the disclosures of which are expressly incorporated herein by reference.

Submucosal tissue can be obtained from various sources, including intestinal tissue harvested from animals raised for meat production, including, for example, pigs, cattle and sheep or other warm-blooded vertebraes. This tissue can be used in either its natural configuration or in a comminuted or partially digested fluidized form. Vertebrae submucosal tissue is a plentiful by-product of commercial meat production operations and is thus a low cost cell growth substrate, especially when the submucosal tissue is used in its native layer sheet configuration.

The submucosa tissue graft constructs prepared in accordance with the present invention are a substantially acellular matrix that provides a superior cell growth substrate resembling the matrix environment found in vivo. The natural composition and configuration of submucosal tissue provides a unique cell growth substrate that promotes the attachment and proliferation of cells.

It has been reported that compositions comprising submucosal tissue of the intestine of warm-blooded vertebraes can be used as tissue graft materials in sheet or fluidized form. U.S. Pat. No. 4,902,508 describes tissue graft compositions that are characterized by excellent mechanical properties, including high compliance, a high burst pressure point, and an effective porosity index. These properties allow such compositions to be used for vascular and connective tissue graft constructs. When used in such applications the preferred graft constructs serve as a matrix for the in vivo regrowth of the tissues replaced by the graft constructs. U.S. Pat. No. 5,275,826 describes use of fluidized forms of vertebrae submucosal tissues as injectable or implantable tissue grafts.

The present invention is directed to preparation of submucosa tissue graft constructs as an implantable or injectable tissue graft construct. The improved tissue graft constructs are prepared by seeding the submucosal tissue in vitro with pre-selected or predetermined cell types prior to implanting or injecting the graft construct into the host.

The intestines of warm-blooded vertebraes are utilized for various purposes. For example, the small intestines of warm-blooded vertebraes are used in human food preparation for casings for sausages as well as in medical applications. The submucosa layer or inner layer of the small intestines is utilized for various purposes in medical applications as described herein, and therefore the processing of the inner layer or submucosa layer of the small intestines is of considerable interest. One of the initial steps in the preparation of small intestine submucosa is to slit and clean the submucosa layer of the small intestines. Cleaning of the intestines involves a scraping action. This scraping action may be called "despooging". Business demands may require that the intestines be slit and despooged at the slaughterhouse in order to reduce cycle-time and labor costs.

The cleaning of the small intestines is typically done first by washing the inside of the small intestines with, for example, water. While the washing or cleaning of the small intestines with water may be sufficient for the use of the small intestines as a casing material for sausage, additional cleaning may be necessary when utilizing the small intestine submucosa layer for medical purposes. When utilized for medical purposes, subsequent processing in addition to the cleaning of the small intestine submucosa layer with water may be required. Such cleaning of the small intestines may require a scraping action on the intestinal layer. The intestines are split and then the inside layer of the intestines is scraped. Subsequent processing of the small intestine submucosa layer requires two separate operations. The first operation is to longitudinally slit the intestines and the second step involves a scraping action to scrape the small intestine inside layer while washing the layer. This process is known as "despooging". Currently available equipment has required that the two operations be performed for slitting and despooging.

Referring now to FIGS. 2 and 3, prior art equipment, a slitter 1, for slitting and despooging the small intestine submucosa layer is shown. The stationary slitter 1, as shown in FIGS. 2 and 3, is large and not easily portable. The stationary slitter 1 measures approximately 36"×26"×18". The stationary slitter 1 utilizes gears with a chain drive and electronic speed controls. The stationary unit requires the use of foot and hand controls which are difficult for the operator to synchronize during use. The unit has required the awkward holding of two acrylic plates and a precise angle for the cleaning steps. A concern with the stationary splitter was an exposed, unguarded scalpel blade.

SUMMARY OF THE INVENTION

The portable slitter of the present invention is constructed of materials capable for cleaning and for use with mechanical applications. The slitter includes a new scraping design which utilizes a roller tensioned against an acrylic plate. The acrylic plate has a triangular angled plate which opens and lays the intestines flat prior to cleaning. The portable slitter also utilizes a primary roller in order to keep the intestines flat during the scraping or despooging process.

The portable splitter incorporates a cone shaped shaft to open the intestine and position it for cleaning. The shaft also has machined circumferential ridges which causes a primary despooging of the intestines to take place prior to slitting. The cone shaft also includes an inner cavity and radial openings for cooperation with a water supply to wash the intestines during the despooging process.

The present invention is directed to a step in preparing an improved tissue graft construct comprising vertebrae submucosa delaminated from both the external smooth muscle layers and the luminal portions of the tunica mucosa. The cells to be combined with the submucosa are selected based on the cell type of the intended tissue to be repaired. The cells of the tunica mucosa comprise primary cells isolated from epithelial, endothethial or cartilage tissues.

There are certain areas of the body that contain a combination of complex differentiated structures for which regeneration has never shown to be possible. These areas typically heal with great difficulty and damage to these structures creates significant morbidity and often mortality. Examples of such areas include the esophagus, the central nervous system, skin and its appendages, and soft tissue including tendons, ligaments and muscles adjacent a joint, among others.

The combination of the pre-selected population of cells with the submucosa matrix provides an improved tissue graft construct that shows surprising improved wound healing capabilities and better restoration of tissue function when compared to the use of either component alone as a therapeutic agent. Furthermore, the composition comprising submucosa seeded with added cells can be cultured prior to the implantation of the construct into the affected region. Intestinal submucosa is capable of supporting the proliferation and growth of a wide variety of cells, including primary cells that are normally difficult to culture in vitro. The ability of submucosa to provide a substrate that supports the growth of such cells provides the opportunity to expand a population of cells prior to implantation into a host. The submucosa may be seeded with autologenous cells isolated from the patient to be treated.

According to one embodiment of the present invention, there is provided a device for preparing small intestines of a vertebre. The device includes a body for cooperation with the small intestines. The body defines an external periphery of the body. The device further includes means for longitudinally slitting the small intestines. The means for longitudinally slitting the small intestines is operably associated with the body. The device further includes first and second scraping members. The means for longitudinally slitting the small intestines is positioned between the two scraping members.

According to another embodiment of the present invention there is provided device for removing SIS from the small intestines of a mammal. The device includes a body for cooperation with the small intestines. The body defines a surface of the body. The device also includes a cylindrical member in juxtaposition with the body. The cylindrical member is adapted for at least partial insertion into the small intestines.

The device further includes means for longitudinally slitting the small intestines. The means for longitudinally slitting the small intestines is operably associated with the cylindrical member and/or the body. The device also includes a rib formed on the cylindrical member.

According to a further embodiment of the present invention, there is provided a method for preparing small intestine submucosa. The method further includes the steps of slitting the small intestines and scraping the small intestines. The steps of slitting the small intestines and scraping the small intestines are performed as the small intestines are advanced in a continuous, integral form.

The technical advantages of the present invention include the ability to perform the cleaning and scraping operations at the slaughterhouse. For example, according to one aspect of the present invention, a device for preparing small intestines of vertebrae is provided. The device includes a body for cooperation with the small intestines with the body defining an external periphery of the body. The device further includes a means for longitudinally slitting the small intestines operably associated with the body as well as means for despooging the small intestines in juxtaposition with the body. The slitting and despooging of the small intestines thus occurs in proximity to each other. By providing the slitting and despooging in proximity to each other, a small compact and lightweight device may be provided. Thus the present invention provides for the ability to perform the operation at the slaughterhouse.

The technical advantages of the present invention further include a reduced cycle time for cleaning and despooging the small intestines. For example, according to another aspect of the present invention, a device for preparing small intestines of a vertebrae is provided including a body with means for slitting the small intestines associated with the body as well as means for despooging the small intestines in juxtaposition with the body. The slitting and despooging of the small intestines thus is able to be carried out close to each other. Thus, with one pass of the small intestines, both slitting and despooging can occur. Thus the present invention provides for a reduced cycle time in preparing small intestines.

The technical advantages of the present invention include the ability to more easily clean the device for preparing small intestines. For example, according to yet another aspect of the present invention, a device for preparing small intestines of the vertebrae includes a body as well as means for slitting the small intestines associated with the body and means for despooging the small intestines in juxtaposition with the body. By providing the device with a body with slitting and despooging capability associated with the body, the device may be small, compact, and easy to clean. Thus, the present invention provides for a device that is easier to clean.

The technical advantages of the present invention also include the ability to slit and clean in one operation or in a single pass. For example, according to yet another aspect of the present invention, a device for preparing small intestines of vertebrae is provided including a body as well as means for slitting the intestines operably associated with the body as well as means for despooging the small intestines in juxtaposition with the body. The device provides for a continual flow of the small intestines from a continuous tube to being longitudinally slit and despooged all in one continual operation. Thus, the present invention provides for the ability to slit and clean in one operation.

The technical advantages of the present invention further include the ability to leave the slitter waste at the slaughterhouse. For example, according to yet another aspect of the present invention, a small light weight device for preparing small intestines is provided, including a body as well as means for slitting the small intestines associated with the body and means for despooging the small intestines in juxtaposition with the body. Thus, the device may be small and lightweight and may be utilized at the slaughterhouse. By providing the small lightweight device which may be carried to the slaughterhouse, the slitter waste may be left at the slaughterhouse.

The technical advantages of the present invention also include the ability to provide a portable device that is reliable and efficient. For example, according to yet another aspect of the present invention, a device for preparing small intestines of vertebrae is provided with only a few moving parts, including a body as well as means for slitting and means for despooging the small intestines. Thus, the present invention provides for a small lightweight device for slitting and despooging the intestine that is reliable and efficient.

Other technical advantages of the present invention will be readily apparent to one skilled in the art from the following figures, descriptions and claims.

BRIEF DESCRIPTION OF THE DRAWINGS

FIG. 12 is a cross-sectional view of FIG. 11 along the line 12-12 in the direction of the arrows;

FIG. 13 is a cross-sectional view of FIG. 8 along the line 13-13 in the direction of the arrows;

FIG. 13A is a partial view of FIG. 13 showing the intestine pathway;

FIG. 14 is a perspective view of another device for processing intestines of a vertebre in accordance to another embodiment of the present invention;

DETAILED DESCRIPTION OF THE INVENTION

Embodiments of the present invention and the advantages thereof are best understood by referring to the following descriptions and drawings, wherein like numerals are used for like and corresponding parts of the drawings.

Figure 1:
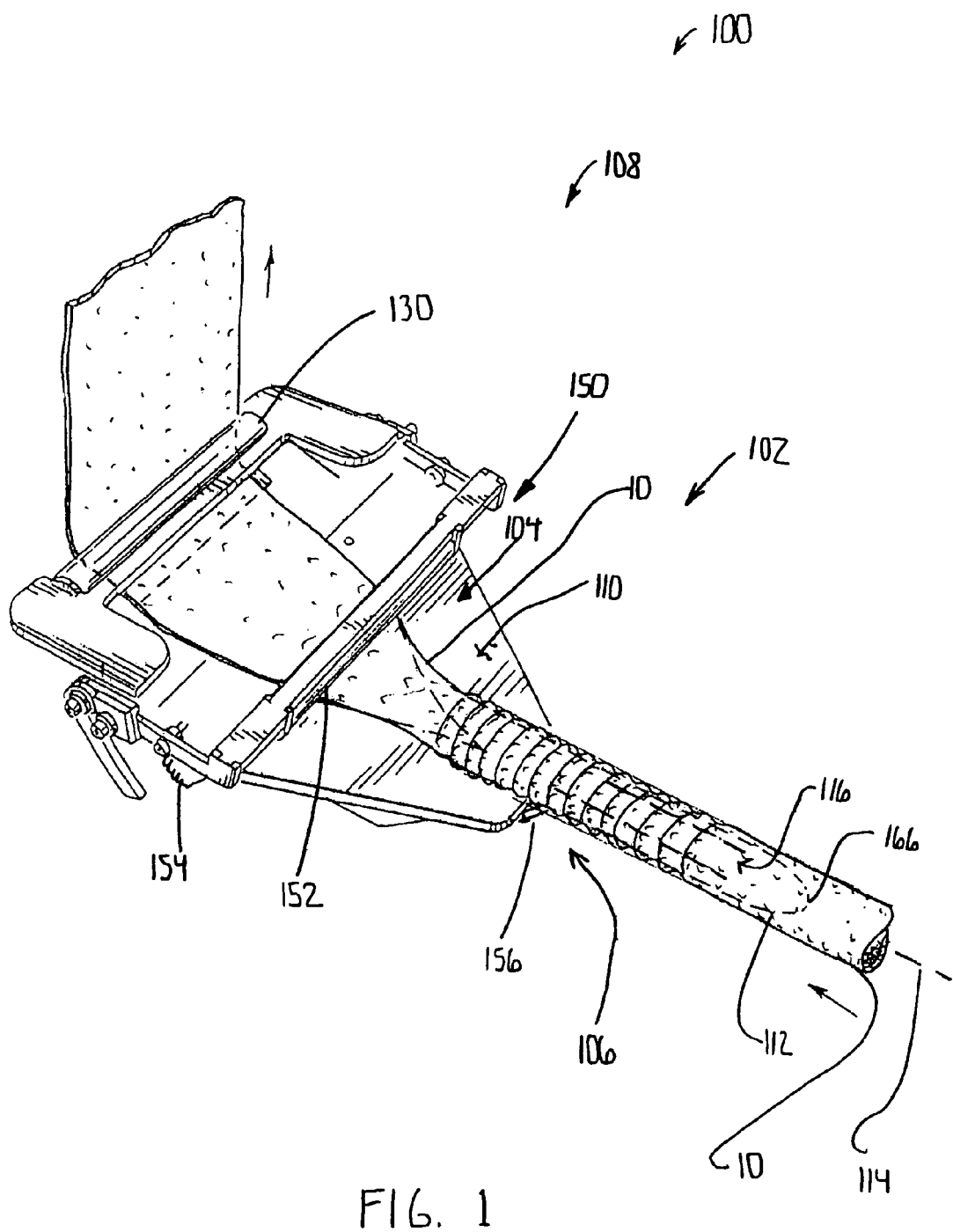
FIG. 1 is a perspective view of a device for processing intestines of a vertebre in accordance to an embodiment of the present invention with intestines shown being processed with the device.

According to the present invention and referring now to FIG. 1, a device 100 for preparing small intestines 10 of a vertebrae is shown.

Figure 4:
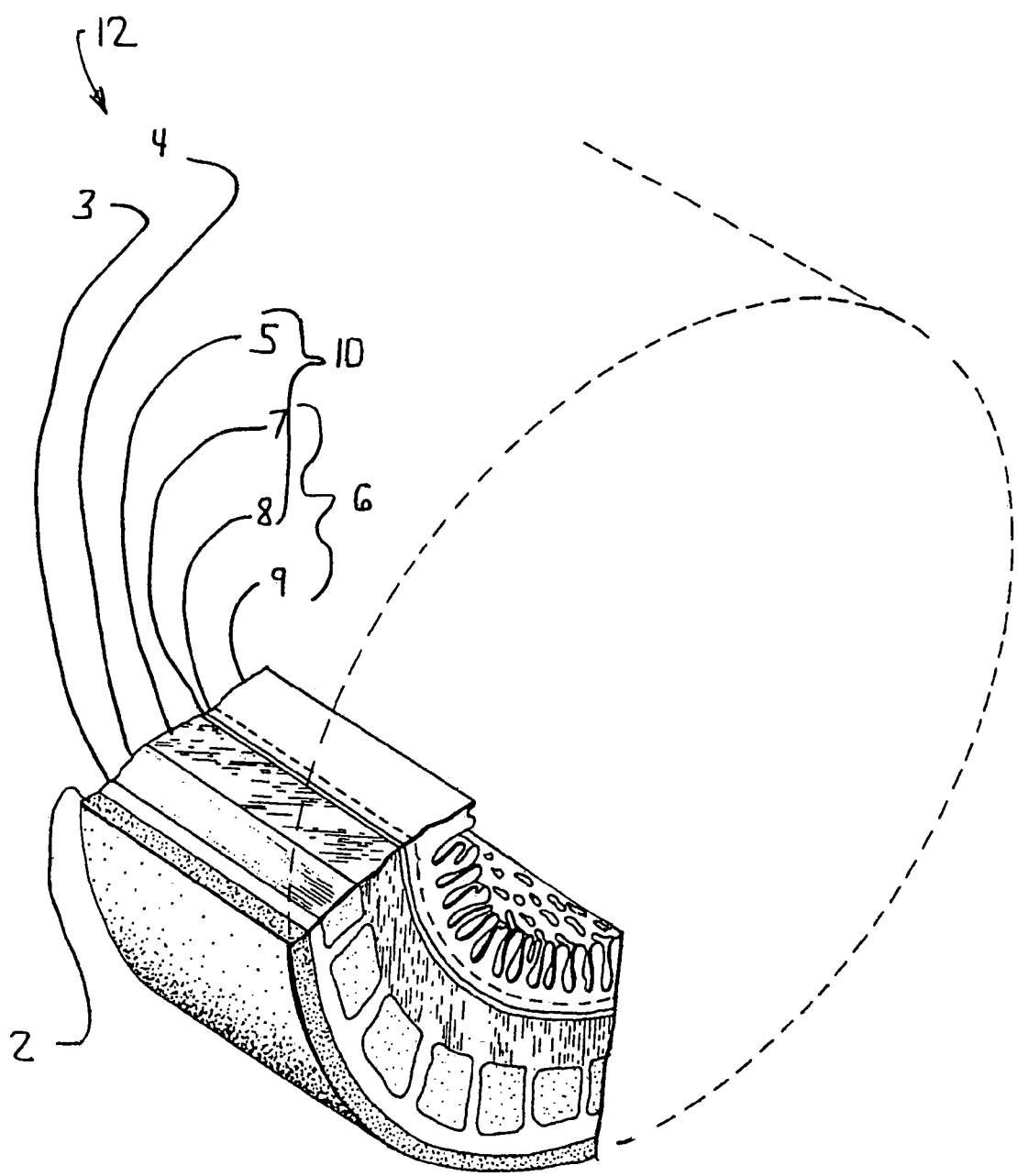
FIG. 4 is perspective view shown in cross-section of a portion of the small intestines of a vertebre.

Referring now to FIG. 4, unprocessed small intestine 12 is shown in greater detail. The unprocessed small intestine 12 is made of a number of discrete tissue layers. For example, and as shown in FIG. 4, the discrete tissue layers 2, 3, 4, 5, 7, 8, and 9 are shown. The outermost layer 2 represents the mesenteric tissues. The mesenteric tissues are depicted as a distinct layer for illustrative purposes only. Ordinarily, such tissues do not appear as a discrete layer, but rather appear as discontinuous tissue segments. Layers 3 and 4 represent the tunica serosa and the tunica muscularis, respectively. Layer 5, the tunica submucosa, is a dense, irregular, collagenous connective tissue often harboring numerous mast cells.

Layers 7, 8 and 9, which are collectively described as tunica mucosa 6. Layer 7 is a layer of smooth muscle tissues known as the lamina muscularis mucosa. Layer 8, the stratum compactum, consists of acellular collagen and elastin fibers. Layer 9 consists of the lamina, epithelialis mucosa, and its lamina propria, which together and arranged in villous processes, a series of finger-like outgrowths of the mucous membrane.

The portion of the small intestine which is processed with the device of the present invention includes the tunica submucosa 5 along with basilar portions of the tunica mucosa, particularly the lamina muscularis mucosa 7 and the stratum compactum 8. The layers 5, 7, and 8 are collectively referred to hereafter as small intestine submucosa (SIS).

The SIS material represents the material that is further processed for medical applications in which is the subject of the device of the present invention.

Figure 5:
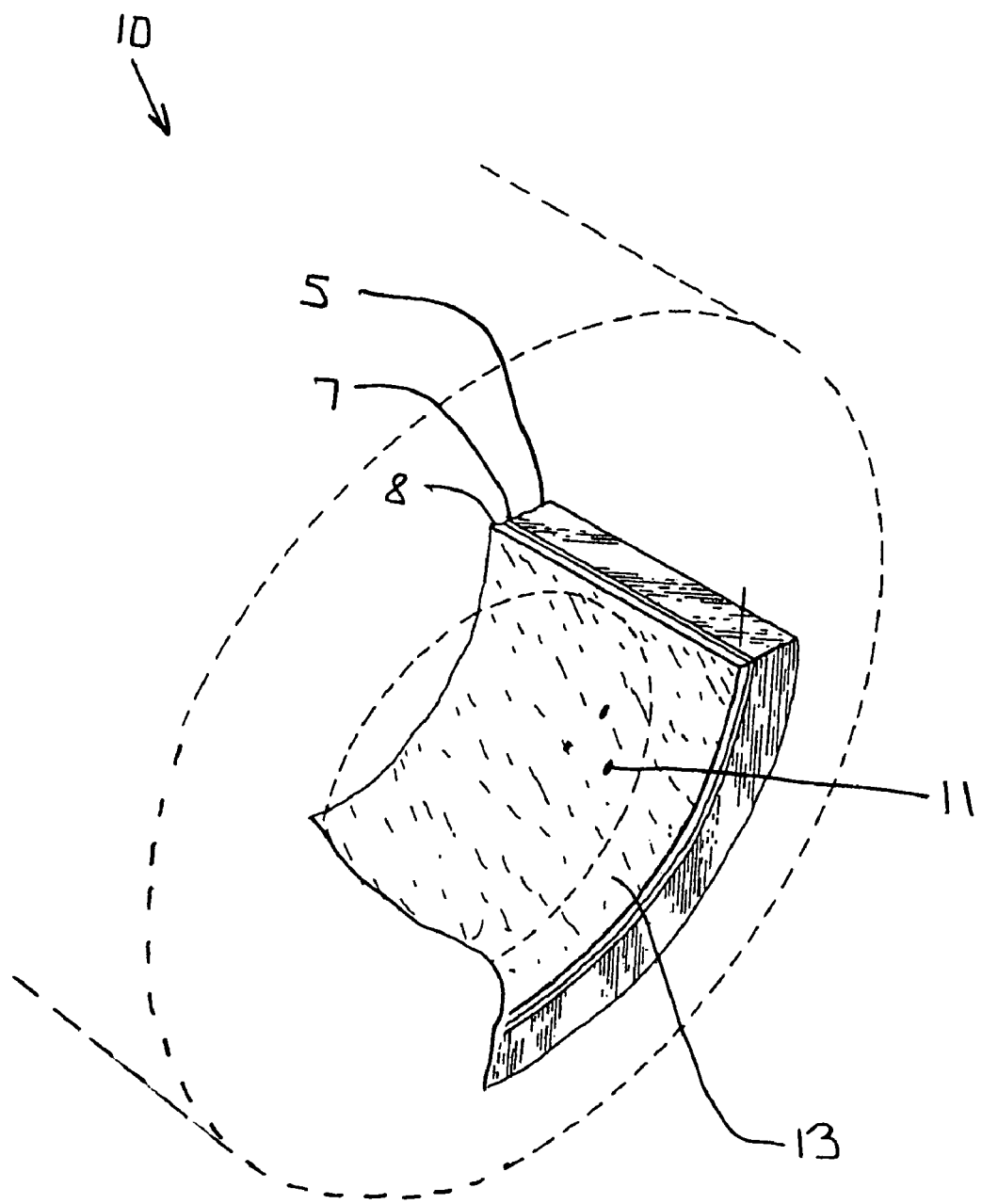
FIG. 5 is perspective view shown in cross-section of a portion of the small intestine submucosa layer of a vertebre.

Referring now to FIG. 5, the SIS layers of the small intestine are shown as intestine SIS 10. The intestine SIS 10 includes an outer layer 5 consisting of the tunica submucosa 5. The SIS intestine 10 includes a middle layer 7 also known as the lamina muscularis mucosa as well as an inner layer 8 also known as the stratum compactum. The device of the present invention is utilized to assist in removing contamination 11 from inner surface 13 of the small intestine SIS 10.

Referring again to FIG. 1, the device 100 for preparing small intestines 10 of a vertebrae is shown. The device 100 includes a body 102 for cooperation with the small intestines 10. The body 102 defines an external periphery 104 of the body 102. The device 100 further includes means 106 for longitudinally slitting the small intestines 10. Means 106 is operably associated with the body 102.

The device 100 further includes means 108 for despooging the small intestines. Means 108 is in juxtaposition with the body 102.

As shown in FIG. 1, the body 102 may define a planer surface 110 of the body 102. The device 100 may further include a cylindrical member 112 which is in juxtaposition with the body 102.

Figure 1A:
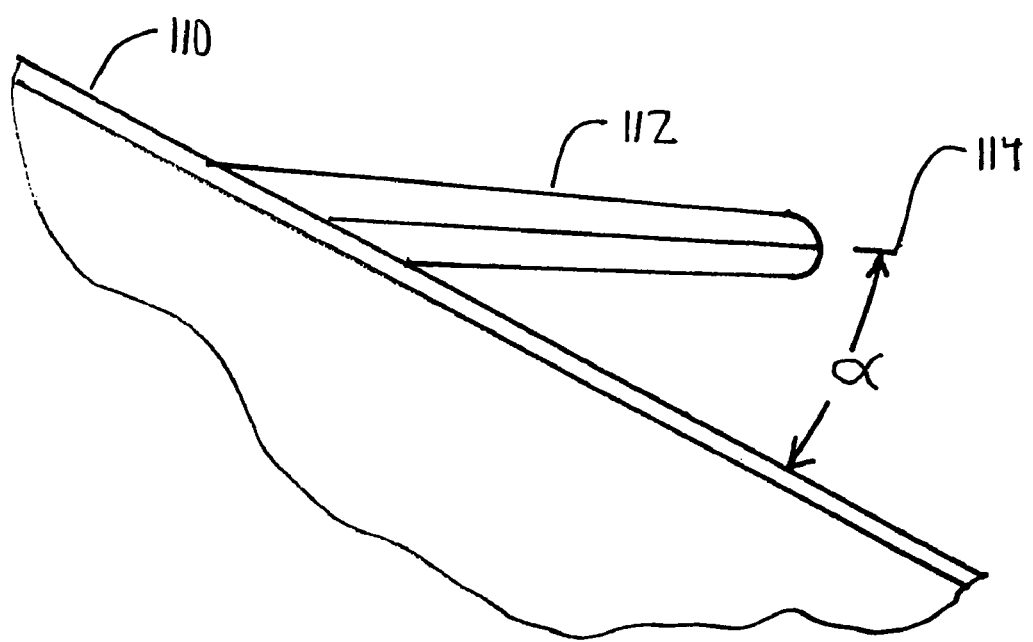
FIG. 1A is a partial plan view, partially in cross-section of the FIG. 1 device showing the cylindrical neck at the body.
Figure 2:
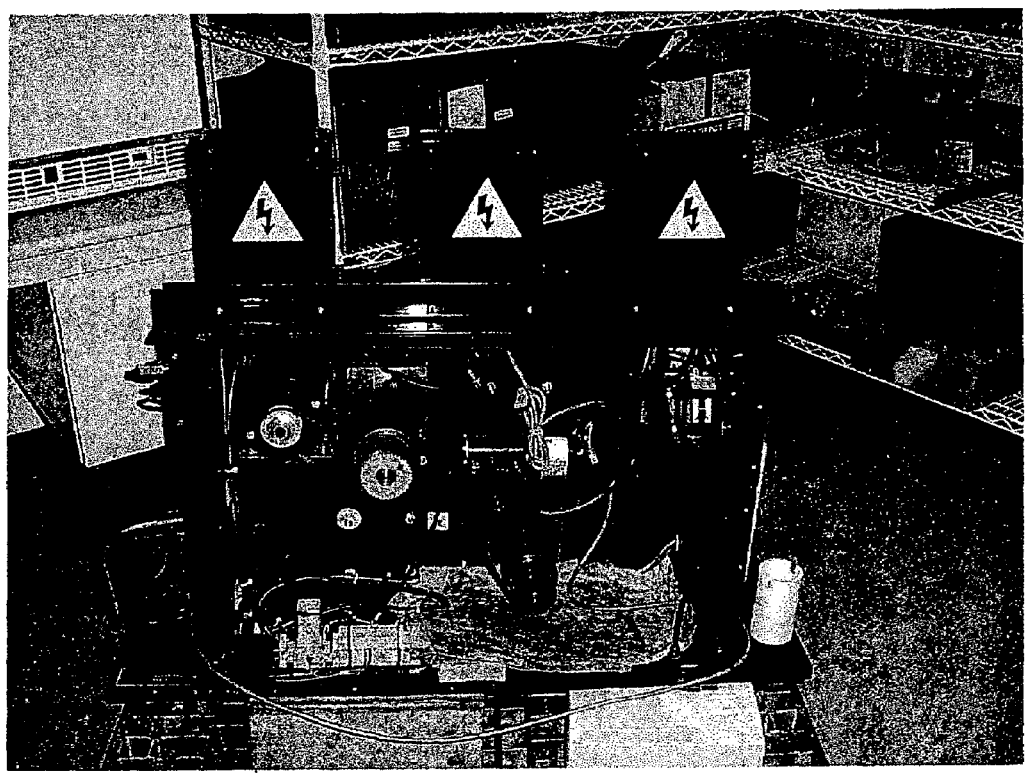
FIG. 2 is a perspective view of a prior art device for processing intestines.
Figure 3:
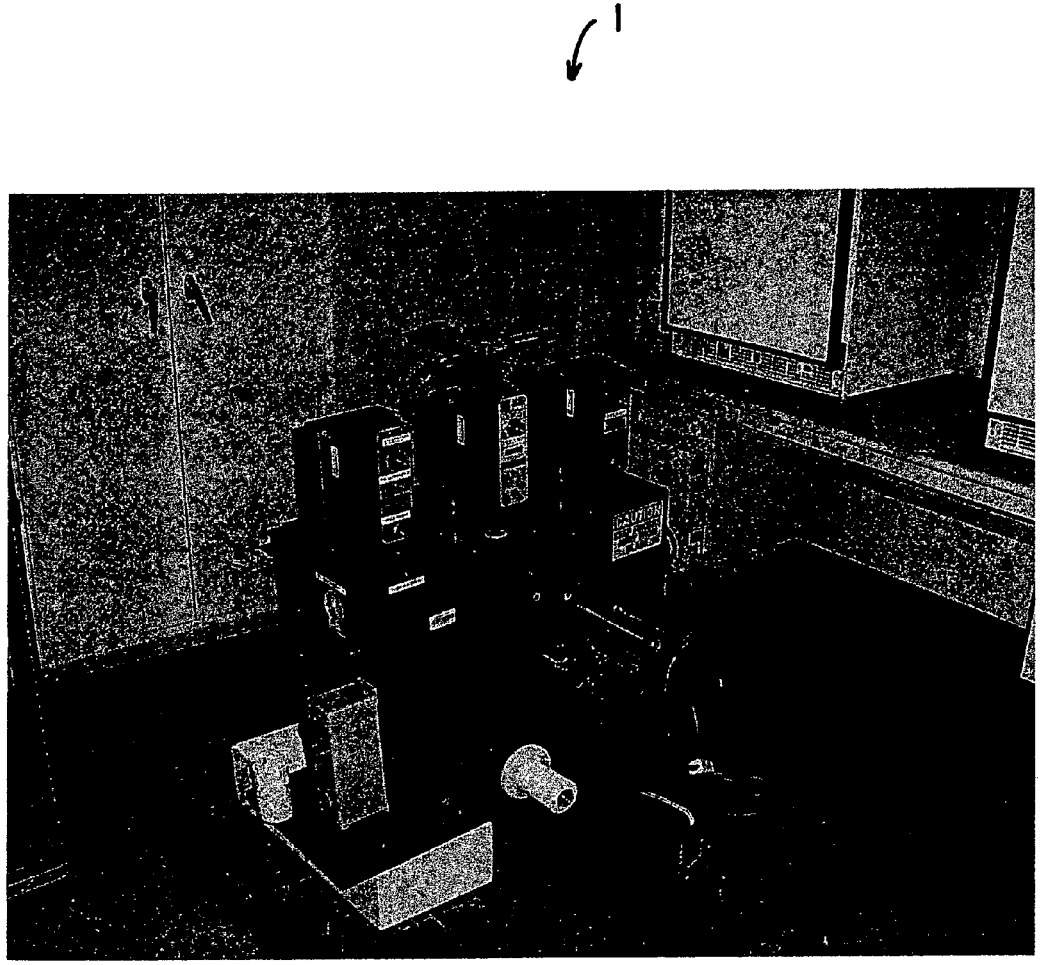
FIG. 3 is another perspective view of the prior art device of FIG. 2.

Referring now to FIG. 1A, the cylindrical member 112 may define a longitudinal axis 114 of the cylindrical member 112. The longitudinal axis 114 may intersect the planer surface 110 at an angle $\alpha$ of, for example, from about 5° to 35° degrees.

Referring again to FIG. 1, the cylindrical member 112 may define a conduit or longitudinal opening 116 in the cylindrical member 112 for passage of a fluid through the cylindrical member 112.

Figure 8:
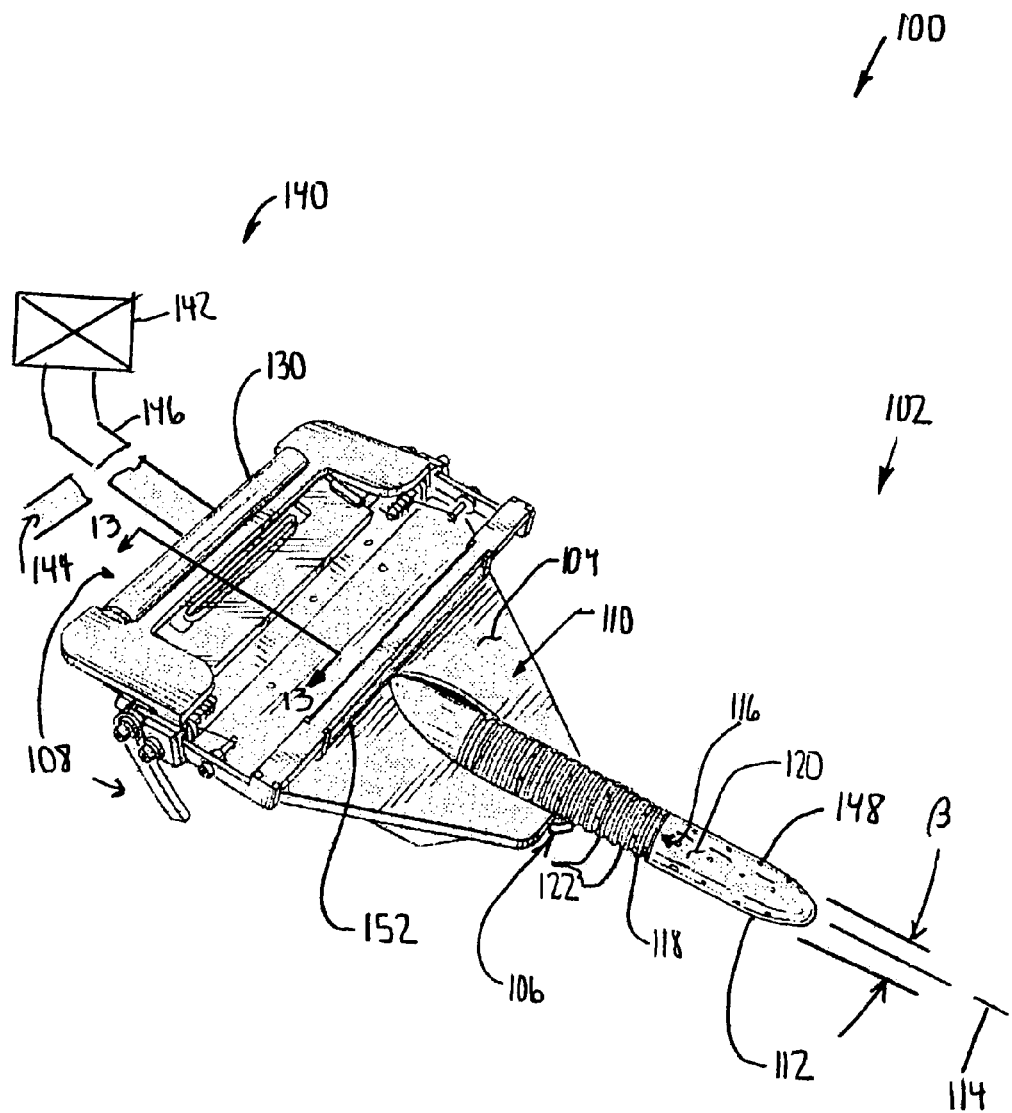
FIG. 8 is another perspective view of the device of FIG. 1 showing the device without the intestines.

Referring now to FIG. 8, the device 100 is shown in greater detail. The device 100 includes means 108 for despooging the intestines 10. Means 108 for despooging of the device 100 may be any suitable means for despooging or scraping or cleansing the small intestines 10. For example, and as shown in FIG. 8, means for despooging 108 may include a circumferential rib 118 formed on external periphery 120 of the cylindrical member 112. While a single rib 118 may be utilized to provide means for despooging 108, the cylindrical member 112 may include additional ribs 122 spaced from the first rib 118 formed on the cylindrical member 112.

Figure 8A:
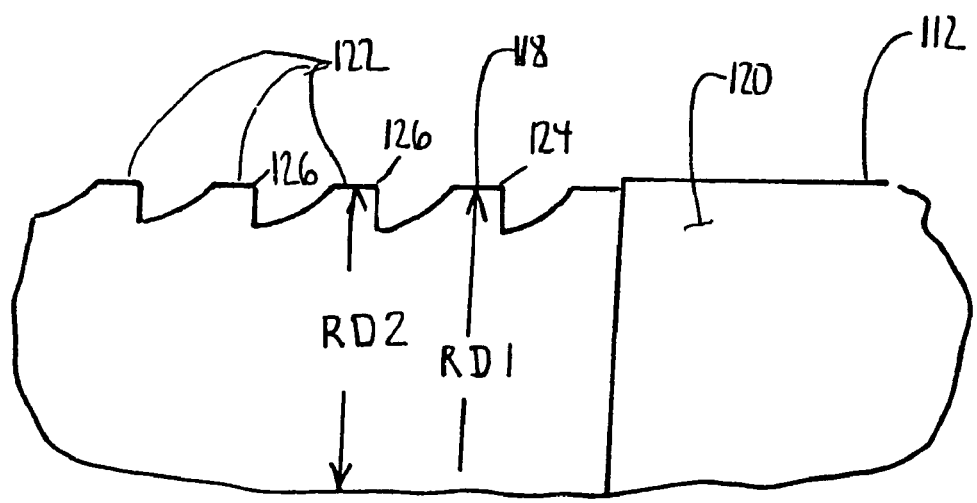
FIG. 8A is a partial plan view of the device of FIG. 1 showing the cylindrical member in greater detail.

Referring now to FIG. 8A, the first rib 118 and the additional ribs 122 of the cylindrical member 112 are shown in greater detail. The first rib 118 includes a leading edge 124 which is generally sharp, having a radius of less than 0.010 inches. The leading edge 124 serves to scrape or despooge the small intestines 10. The additional ribs 122 also include a leading edge 126 which is, likewise, generally sharp.

The first rib 124 defines a rib diameter RD-1. Similarly, the second rib 122 defines a rib diameter RD-2 and so forth. As shown in FIG. 8A, the diameter RD-2 of the second rib 122 may be somewhat larger than the diameter RD-1 of the first rib 118, thereby providing for progressive scraping of the small intestines 10.

Referring again to FIG. 8, external periphery 120 of the cylindrical member 112 defines an included angle beta $\beta$. The angle $\beta$ may be, for example, 1° to 15° and provides for progressive increase in the rib diameter so the progressive scraping can occur.

Referring now to FIG. 13, the means for despooging 108 further may include a despooging plate 128 which operates with a despooging roll 130 to assist in despooging the intestines 10. For example, and as shown in FIG. 13, the intestines 10 are passed along face 132 of the despooging plate 128 until the intestines 10 pass by scraping edge 134 of the despooging plate 128 at which point they are wrapped sharply around despooging roll 130.

The intestines 10 form an obtuse angle theta $\theta$ of between 90° to 145° to provide a scraping action on the inner surface 14 of the intestines 10. The scraping edge 134 defines a radius R which preferably is less than 0.01 inches. Material 16 despooged from the inner surface 12 of the intestines 10 may pass along surface 132 of the despooging plate 128 and through openings 136 formed in the despooging plate 128.

The despooging plate 128 may be made of any suitable durable material. For example, the despooging plate 128 may be made of a plastic or a metal. The despooging plate may be made of, for example, a plastic, for example, an acrylic plastic. The other components of the device 100 may be made of any suitable, durable material such as a metal or a plastic. If made of a metal the component may be made of, for example, a steel alloy.

Referring again to FIG. 8, the device 100 may further include means 140 for applying fluid to the small intestines for assisting in further cleaning the small intestines. Means 140 for applying fluid may be, for example, in the form of a pump 142 or a municipal water supply 144. Means 140 for applying the fluid may further include tubing 146 for guiding the fluid from the pump 142 or municipal water supply 144 to the conduit 116 formed in cylindrical member 112.

Fluid from the pump 142 or the municipal water supply 144 may pass from tubing 146, through the conduit 116 in cylindrical member 112, and out radial openings 148 formed through external periphery 120 of the cylindrical member 112.

Referring again to FIG. 1, the device 100 may further include means 150 for flattening the small intestines 10. Means 150 for flattening the small intestines 10 may, as shown in FIG. 1, be in the form of a biased flattening member, for example flattening roll 152 in juxtaposition with respect to exterior periphery 104 of the body 102. The flattening member 152 is adapted to flatten the small intestines 10. A spring 154 may be utilized to urge the flattening member 150 toward the periphery 104 of the body 102 to flatten the small intestines 10 positioned therebetween.

Figure 11:
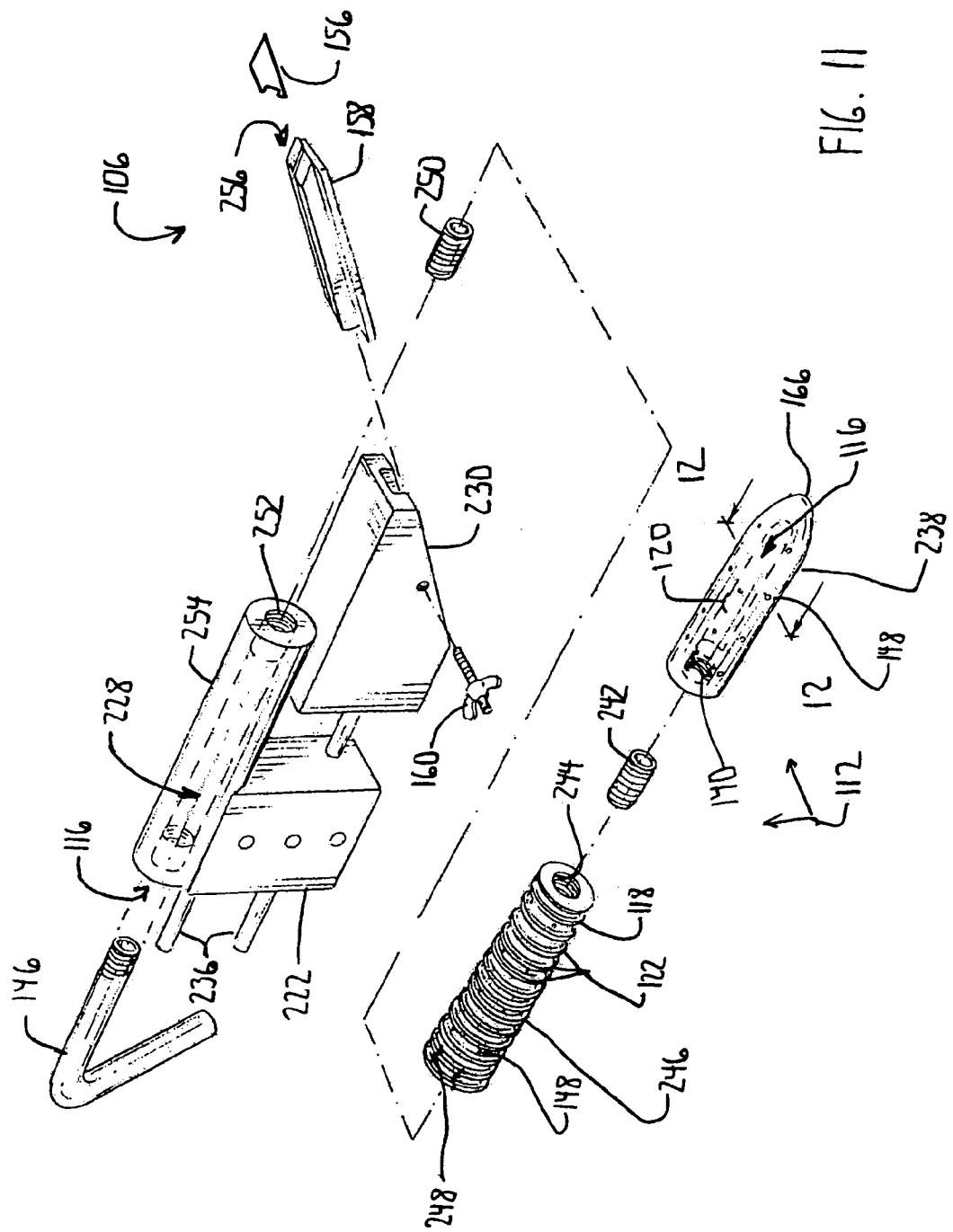
FIG. 11 is a partial exploded perspective view of the device of FIG. 8 showing the cylinder.

Referring now to FIG. 11, means 106 for slitting the intestines 10 may be in the form of, for example, a cutting tool 156. The cutting tool 156 may, as is shown in FIG. 11, be in the form of a scalpel.

The cutting tool or scalpel 156, as is shown in FIG. 11, may be held by, for example, blade holder 158. The scalpel 156 may be removably secured to the blade holder 158 by, for example, wing nut 160.

Figure 11A:
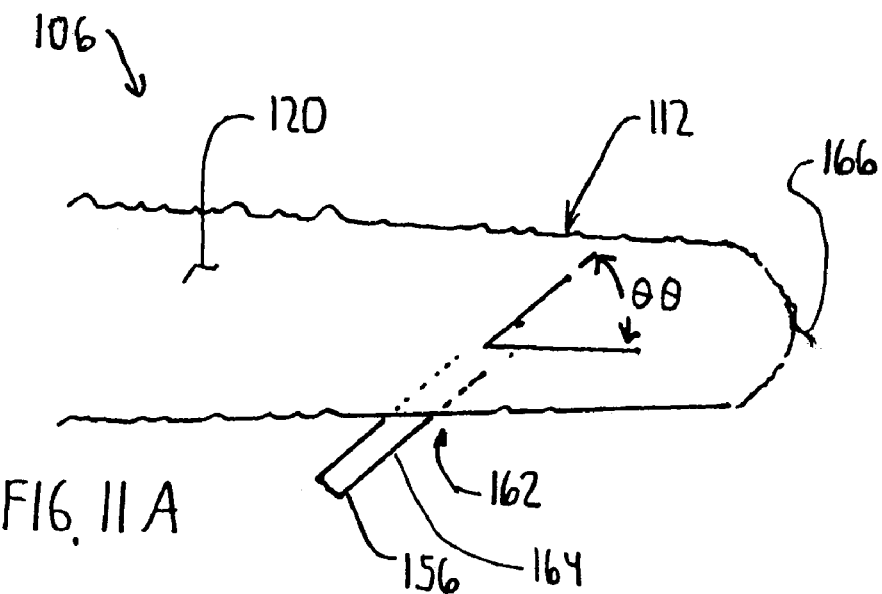
FIG. 11A is a partial plan view of the device of FIG. 8 showing the cylinder and scalpel in greater detail.

Referring now to FIG. 11A, means 106 for slitting the intestines 10 in the form of, for example, scalpel 156, is positioned adjacent periphery 120 of the cylindrical member 112. For example, and as shown in FIG. 11A, the cylindrical member 112 defines longitudinal slot 162 through which scalpel 156 is permitted to pass. Cutting edge 164 of the scalpel 156 is positioned toward nose 166 of the cylindrical member 112. The scalpel 156 is positioned at an included angle $\theta\theta$ of, for example, 20 to 70 degrees.

Figure 11B:
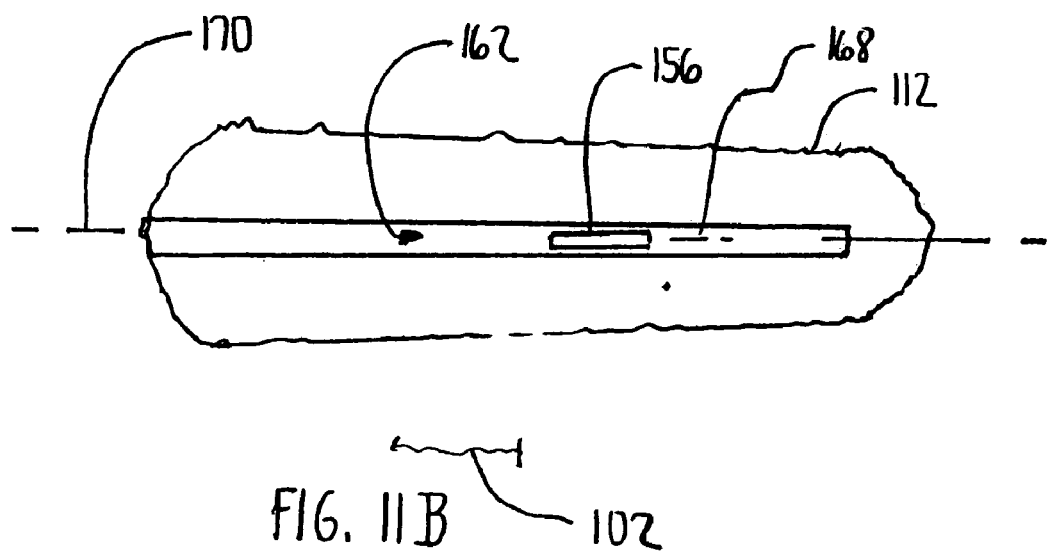
FIG. 11B is a partial bottom view of the device of FIG. 8 showing the cylinder and scalpel in greater detail.

Referring now to FIG. 11B, the scalpel 156 is shown positioned in slit 162 of the cylindrical member 112. The scalpel 156 defines scalpel longitudinal axis 168. The body 102 likewise defines a body longitudinal axis 170. Longitudinal axis 170 of the body 102 and the longitudinal axis 168 of the scalpel 156 are, as shown in FIG. 11B, parallel to each other.

Figure 9:
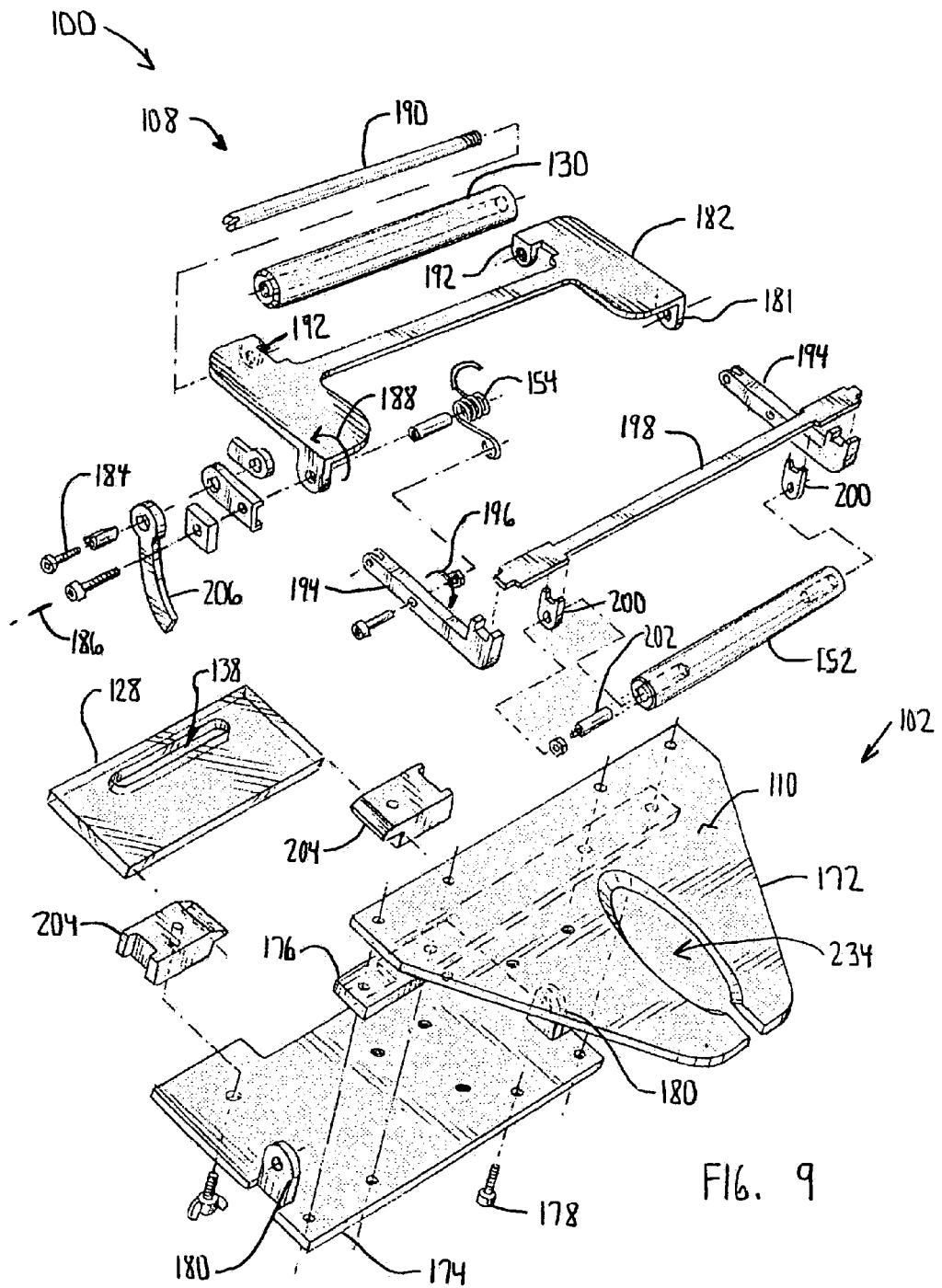
FIG. 9 is a partial exploded perspective view of the device of FIG. 8 showing the plates and the rollers.

Referring now to FIG. 9, the device 100 is shown in greater detail. The device 100 includes the body 102. As shown in FIG. 9, the body 102 includes an upper plate 172 as well as a lower plate 174. A spacer 176 is sandwiched between the upper plate 172 and the lower plate 174. A plurality of fasteners in the form of threaded screws 178 may be utilized to assemble the lower plate 174, the spacer 176, and upper plate 172 to each other. It should be appreciated that the plates 172 and 174 may be welded together.

The lower plate 174 includes spaced apart roll supports 180 for pivotally securing plate support 182. Fasteners 184 are used to secure pivotly the plate support 182 to the lower plate 174. The plate support 182 pivots about plate support axis 186 and is urged by spring 154 in the direction of arrow 188.

The despooging roll 130 is rotatably secured to the plate support 182 by means of, for example, a despooging roll support rod 190 which is matingly fitted inside despooging roll 130. The despooging roll support rod 190 is fitted to despooging roll supports 192 formed on the plate support 182.

Support arms 194 are pivotally connected to the roll supports 180 of the lower plate 174. The support arms 194 are urged by spring 154 in the direction of arrow 196. An upper plate 198 is secured to support arms 194. Flattening roll supports 200 extend from upper plate 198 and cooperate with rods 202 to rotatably support flattening roll 152.

The spring 154 is utilized to urge the despooging roll 130 in the direction of arrow 188 against despooging plate 128 while the spring 154 is used to urge the support arms 194 and in turn the flattening roll 152 in the direction of arrow 196 against surface 110 of upper plate 172. The despooging plate 128 is secured to the lower plate 174 by means of, for example, plate brackets 204.

Figure 9A:
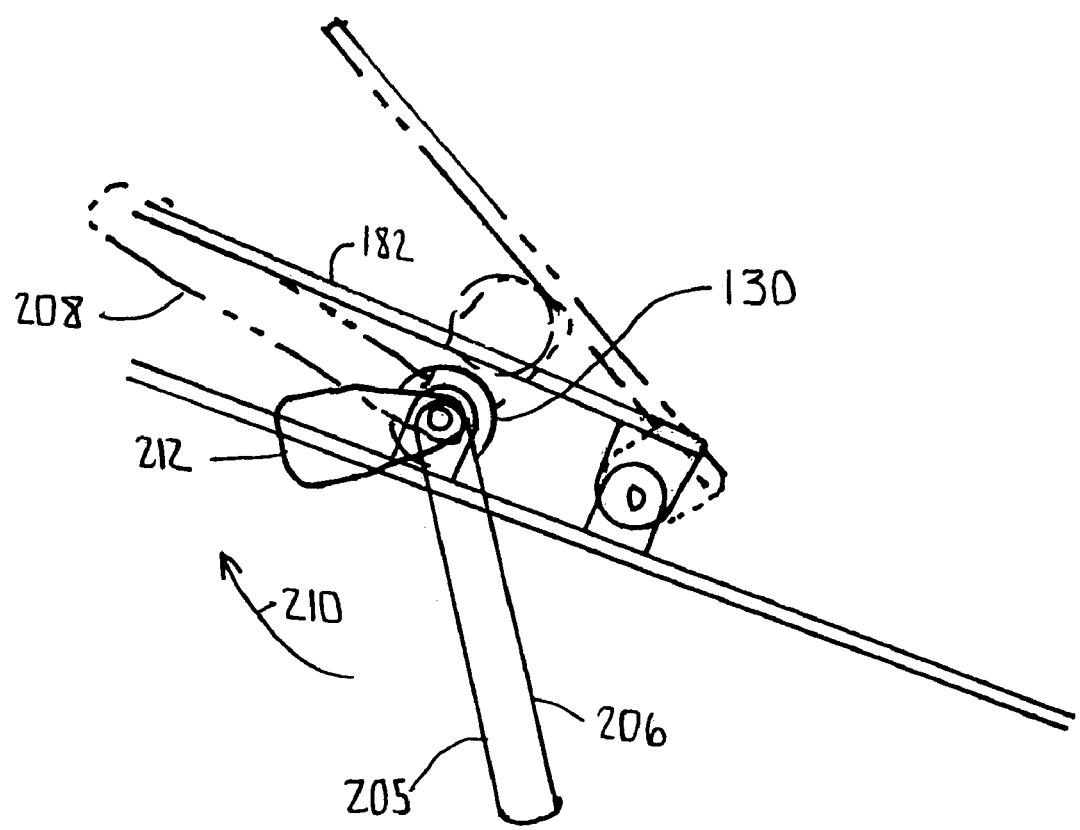
FIG. 9A is a partial plan review of the device of FIG. 8 showing the lever mechanism in greater detail.

Referring now to FIG. 9A, positioning arm 206 is utilized to position the despooging roll 130 into an upper or feed position as shown in phantom in FIG. 9-B. When the arm 206 is rotated in the direction of arrow 210, a lifter 212 is advanced from first position 205 shown in solid to second position 208 (shown in phantom). The lifter 212 raises the plate support 182 from its first position 205 (in solid) to its second position 208 (in phantom) to thereby raise the despooging roll 130 to second position 208 (in phantom).

Figure 10:
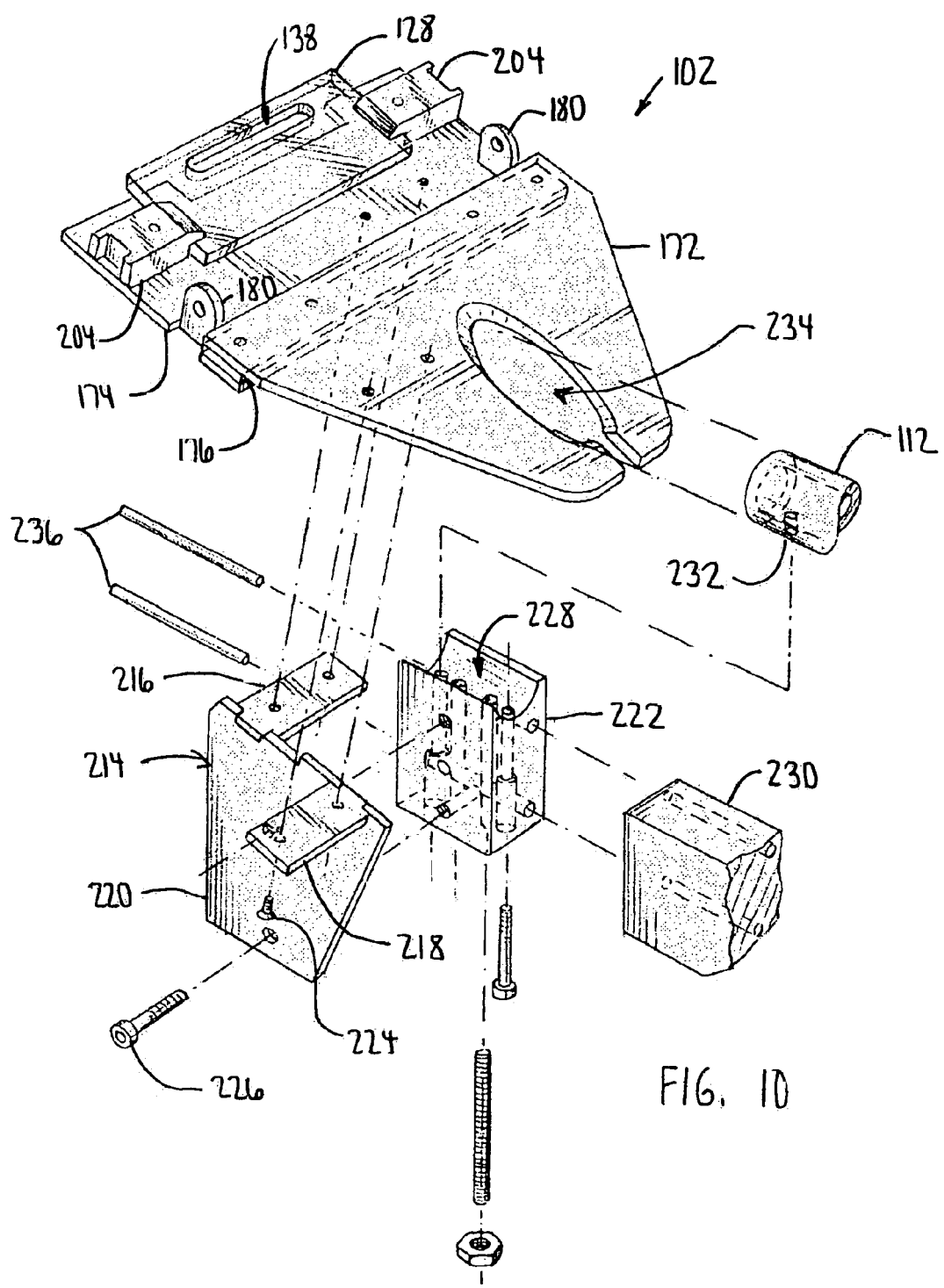
FIG. 10 is a partial exploded perspective view of the device of FIG. 8 showing the bracket for holding the cylinder.

Referring now to FIG. 10, the device 100 is shown in even greater detail. The body 102 including upper plate 172, spacer 176, and lower plate 174 are supported as shown in FIG. 10 by a mounting bracket 214. The mounting bracket 214 includes an inner-flange 216 for supporting the lower plate 174 and an outer-flange 218 for supporting the upper plate 172. The mounting bracket 214 includes a base 220 which is secured to cylinder mounting block 222. Fasteners 224 are used to secure the mounting bracket 214 to the body 102. Additional fasteners 226 are used to secure the mounting bracket 214 to the cylindrical mounting block 222.

The cylindrical mounting block 222 defines a cradle 228 for supporting the cylindrical member 112. A blade block 230 is secured to the cylindrical mounting block 222. A Mounting pin 232 is used to secure the cylindrical member 212 to the cradle 228. A cylindrical opening 234 is formed in the upper plate 172 for permitting the cylindrical member 112 to pass there through.

Rods 236 are utilized to secure the mounting block 222 to the blade block 230.

Referring now to FIG. 11, the cylindrical member 112 is shown in greater detail. While it should be appreciated that the cylindrical member 112, may be integral or have a one-piece construction, as shown in FIG. 11 the cylindrical member 112 is modular. For example and as shown in FIG. 11, the cylindrical member 112 includes a slightly tapered cylindrical nosepiece 238, which includes the nose 166. The cylindrical nosepiece includes internal threads 140 formed in the axial opening 116 of the cylindrical member 112. An externally threaded fastener 242 is threadably secured to internal threads 240 formed on axial opening 116 of the cylindrical nosepiece 238.

The fastener 242 is also secured to internal threads 244 of ribbed member 246. The ribbed member 246 includes a first rib 118 as well as the additional ribs 122. The ribbed member 246 further includes second internal threads 248 which mate with external threads on second threaded fastener 250. The second threaded fastener 250 is threadably secured to internal threads 252 formed on generally cylindrical base 254. The generally cylindrical base 254 is positioned on cradle 228 of the mounting block 222. Blade holder 158 is secured to blade block 230 and the blade holder 158 holds scalpel 156 in scalpel slot 256.

Referring now to FIG. 12, a cross-section of cylindrical nosepiece 238 is shown in greater detail. The cylindrical nosepiece 238 defines the axial central opening or conduit 116 as well as radial passageways 148. As shown in FIG. 12, six equally spaced radial passageways 148 are used. It should be appreciated that the radial passageways may be positioned other than equally spaced and a different quantity, for example, a single, 2, 3, 4 or 5 radial passageways or more may be positioned on the cylindrical nosepiece 238.

Figure 15:
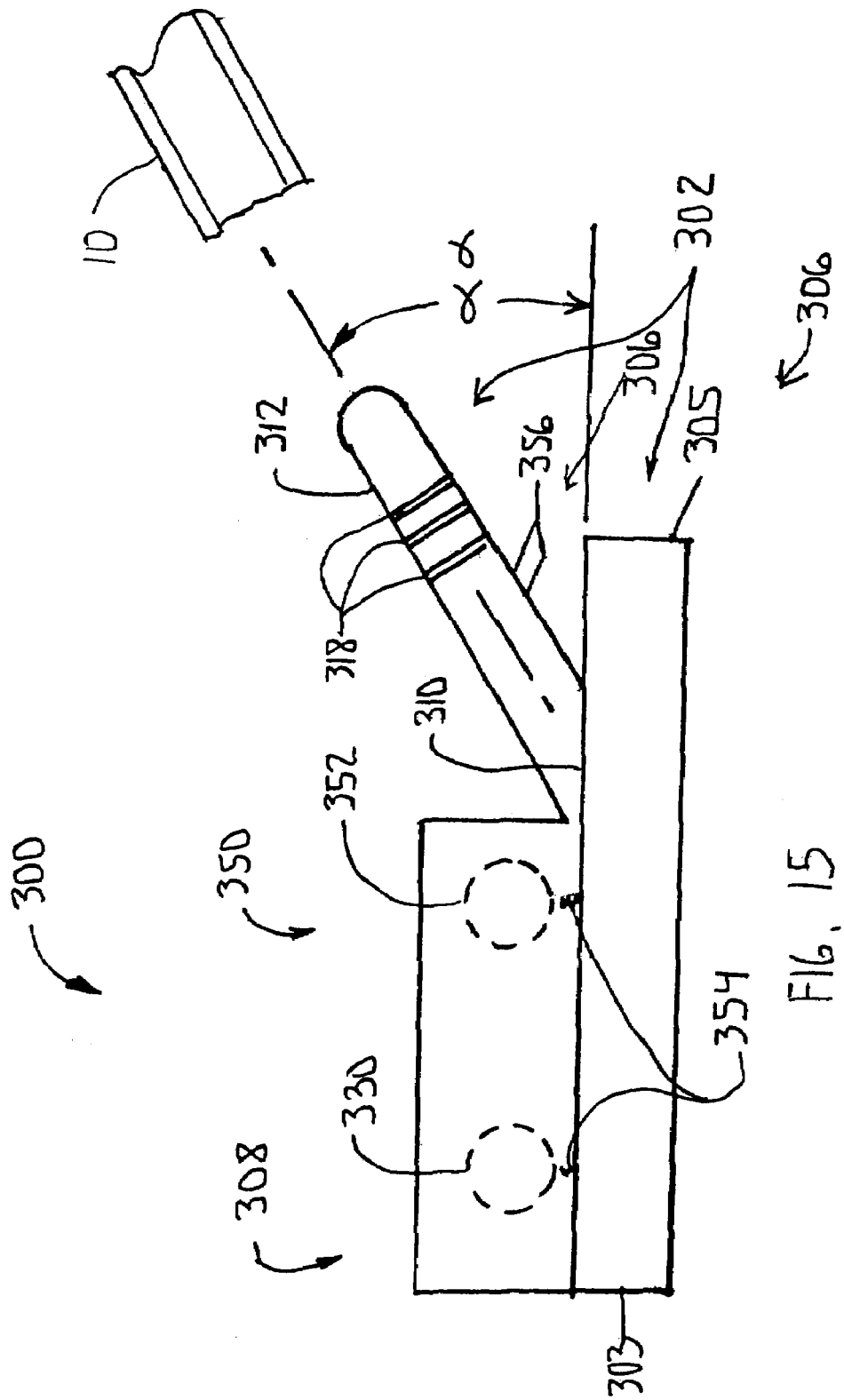
FIG. 15 is a plan view of the device of FIG. 14.

Referring now to FIGS. 14 and 15, yet another embodiment of the present invention is shown as device 300. The device 300 is utilized for preparing small intestines 10 of a vertebrae. The device 300 includes a body 302 for cooperation with the small intestines 10.

Referring to FIG. 15, the body 302 defines an external periphery 304 thereof. The body 302 includes a plate portion 303 as well as a cylindrical portion 312 extending outwardly from planar surface 310 of plate portion 303 at an included angle αα of, for example, 5° to 45°. The cylindrical member 312 defines a plurality of spaced apart ribs 318.

The device 302 further includes means 306 for longitudinally slitting the small intestines 10. The means 306 is operably associated with the body 302. For example and as shown in FIGS. 14 and 15, the means 306 may be in the form of, for example, a knife or a scalpel 356. The device 300 may further include means 108 for despooging the small intestines. The means 308 is in juxtaposition with the body 302.

Means 308 for despooging the small intestines 10 may, as shown in FIGS. 14 and 15, be in the form of a despooging roll 330 which is rollably connected to surface 310 of the body 302. Despooging means 308 may in addition or in the alternative, include a singular or a pair or more of spaced apart angular ribs 318 positioned on periphery 304 of the cylindrical member 312. The device 300 may further include means 350 for flattening the small intestines 10. For example, the means 350 may be in the form of flattening roll 352 which is urged toward surface 310 of the body 302 by, for example, springs 354.

Figure 16:
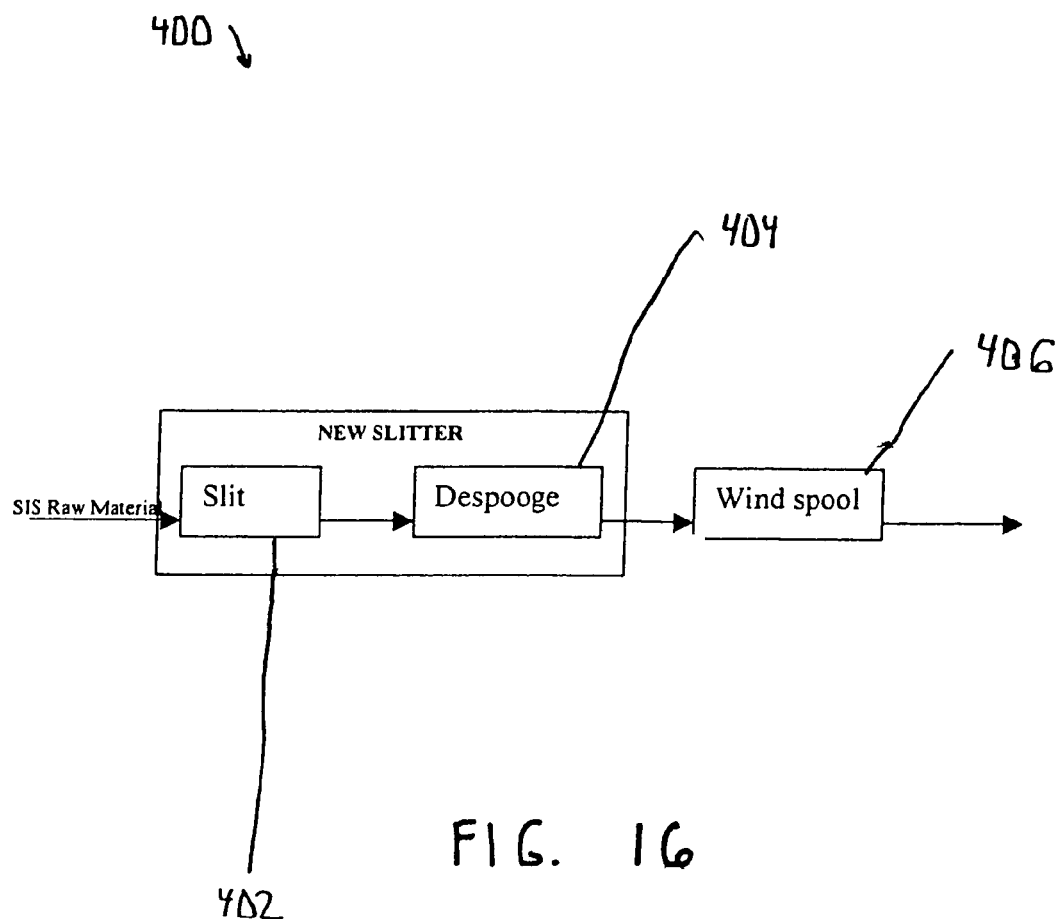
FIG. 16 is a flow chart for a method of processing intestines in accordance to yet another embodiment of the present invention.
Figure 17:
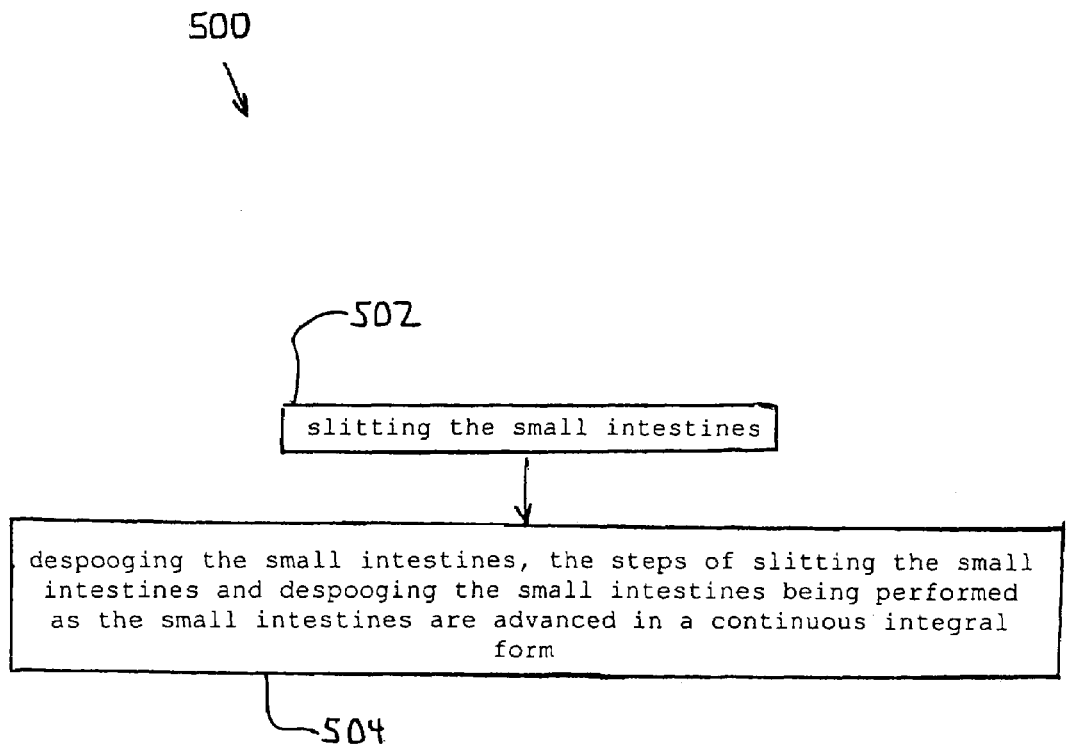
FIG. 17 is a flow chart for a method of processing intestines in accordance to another embodiment of the present invention Corresponding reference characters indicate corresponding parts throughout the several views. Like reference characters tend to indicate like parts throughout the several views.

Referring now to FIG. 16, another embodiment of the present invention is shown as method 400 for preparing SIS material. For example, and as shown in FIG. 16, method 400 includes a first step 402 of slitting the SIS material. The method 400 further includes a second step 404 of despooging the material. The method 400 further includes a third step 406 of winding the material on a winding spool.

Referring now to FIG. 500, yet another embodiment of the present invention is shown as method 500 for preparing SIS material. The method 500 includes a first step 502 of slitting the small intestines and second step 504 of despooging the small intestines. The steps of slitting the small intestines and despooging the small intestines are performed as the small intestines are advanced in a continuous integral form.

Figure 6:
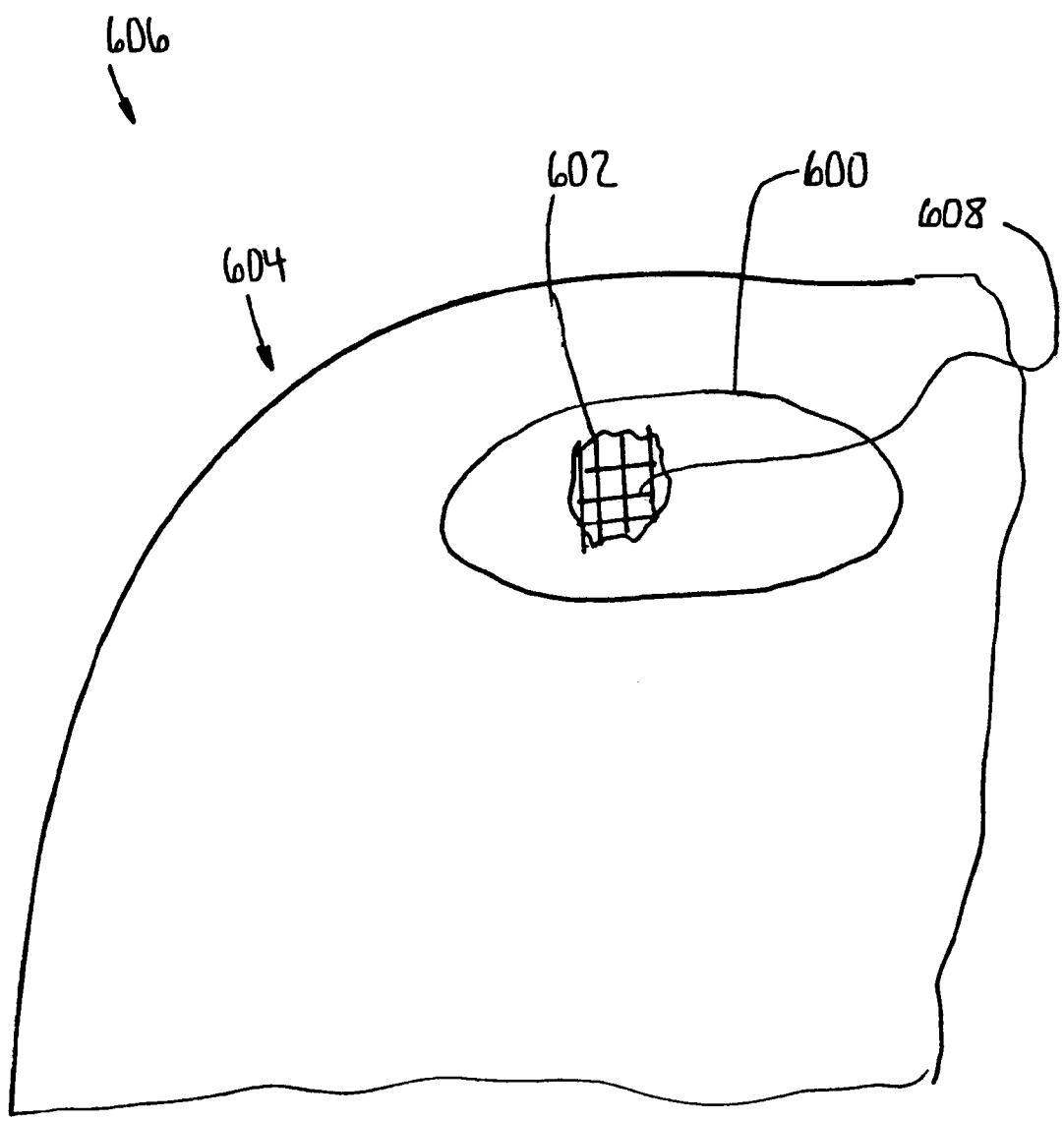
FIG. 6 is a plan view partially in cross section showing a shoulder of a patient with a Restore® patch in position on the torn rotator cuff of a patient.

Referring now to FIG. 6, a series of layers of processed SIS material is shown formed into a generally oval patch 600 which may be positioned adjacent a rotator cuff tear in a shoulder of a patient. The patch 600 is shown in position adjacent rotator cuff tear 602 on the shoulder 604 of a patient 606. The patch 600 includes a series of layers 608 of SIS material.

The SIS composition possesses mechanical properties highly desirable for tissue graft materials, including low porosity index, high compliance, and a hyper-pressure point. Despite the low porosity index of the SIS material, the SIS material is still sufficiently porous to allow neocapilarization to occur within the SIS graft. The SIS material formed in a shoulder provides a scaffolding for soft tissue to develop. After a sufficient period of time; within normally a matter of tissues are repaired.

Figure 7:
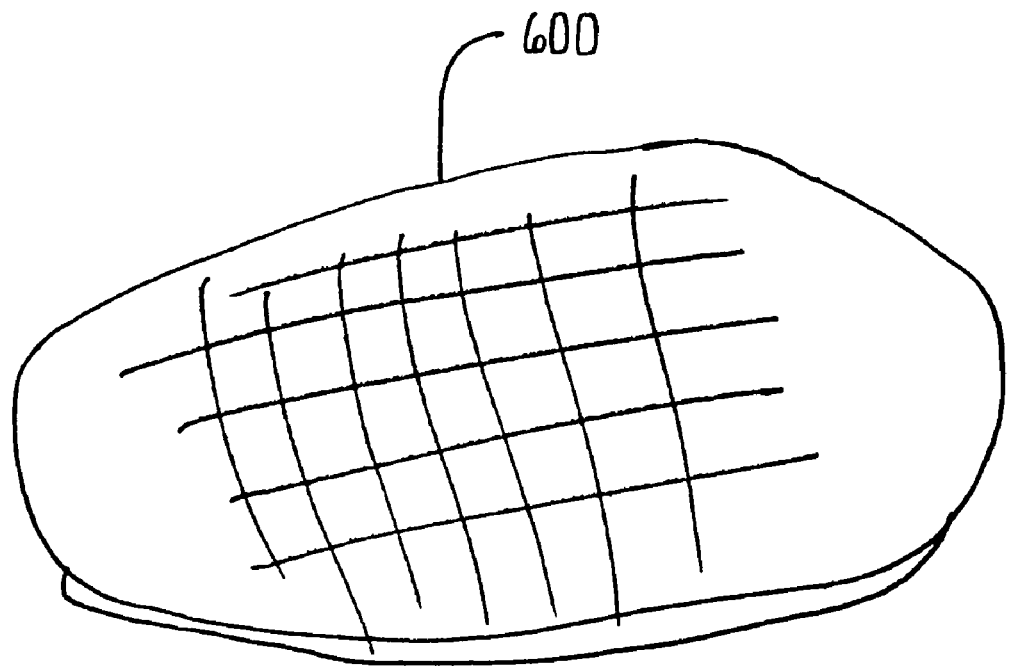
FIG. 7 is a perspective view of the Restore® patch of FIG. 6.

Referring now to FIG. 7, a compilation of SIS material in the form of Restore® patch 600 is shown. The Restore® patch 600 is commercially available from, for example, DePuy Orthopaedics, Inc., Warsaw, Ind.

Although the present invention and its advantages have been described in detail, it should be understood that various changes, substitutions, and alterations can be made therein without departing from the spirit and scope of the present invention as defined by the appended claims.

We claim:

1. A device for preparing small intestines of a vertebrae, said device comprising:
    a body for cooperation with the small intestines, said body defining an external periphery thereof; and
    means for longitudinally slitting the small intestines operably associated with said body; and
    a first scraping member and a second scraping member, and wherein the means for longitudinally slitting the small intestines is positioned between the first scraping member and the second scraping member.

2. The device as in claim 1, wherein said body comprises a member for insertion into the small intestines.

3. The device as in claim 2, wherein said body comprises a cylindrical member.

4. A device for preparing small intestines of a vertebrae, said device comprising:
    a body for cooperation with the small intestines, said body defining an external periphery thereof, said body including a member for insertion into the small intestines, said member comprising a cylindrical member, wherein said cylindrical member comprises a plurality of ribs;
    means for longitudinally slitting the small intestines operably associated with said body; and
    a scraper in juxtaposition with said body.

5. The device as in claim 1:
    wherein said body defines a planar surface thereof; and
    further comprising a cylindrical member in juxtaposition with said body.

6. A device for preparing small intestines of a vertebrae, said device comprising:
    a body for cooperation with the small intestines, said body defining an external periphery thereof and a planar surface thereof;
    a cylindrical member in juxtaposition with said body, wherein said cylindrical member defines a longitudinal axis thereof, the longitudinal axis intersecting the planar surface at an angle of from about 5 to 35 degrees;
    the device further comprising:
    means for longitudinally slitting the small intestines operably associated with said body; and
    a scraper in juxtaposition with said body.

7. The device as in claim 5, wherein said cylindrical member defines a conduit therein for passage of a fluid therethrough.

8. A device for preparing small intestines of a vertebrae, said device comprising:
    a body for cooperation with the small intestines, said body defining an external periphery thereof and a planar surface thereof;
    a cylindrical member in juxtaposition with said body;
    means for longitudinally slitting the small intestines operably associated with said body; and
    a scraper for scraping the small intestines in juxtaposition with said body;
    wherein said means for longitudinally slitting the small intestines extends from the periphery of said cylindrical member.

9. The device as in claim 1, wherein said means for longitudinally slitting the small intestines comprises a cutting tool.

10. The device as in claim 9:
    wherein said cutting tool comprises a blade defining cutting edge having a longitudinal axis thereof; and
    wherein said body has a longitudinal axis thereof the longitudinal axis of said body and of said cutting tool being parallel to each other.

11. The device as in claim 10, wherein said cutting tool is removable from said body.

12. A device for preparing small intestines of a vertebrae, said device comprising:
    a body for cooperation with the small intestines, said body defining an external periphery thereof; and
    means for longitudinally slitting the small intestines operably associated with said body, wherein said means for longitudinally slitting the small intestine comprises a cutting tool wherein said cutting tool comprises a scalpel; and
    a scraper for scraping the small intestines in juxtaposition with said body.

13. The device as in claim 1, wherein one of said scraping members comprises a rib extending from the periphery of said body.

14. The device as in claim 1, wherein one of said scraping members comprises a blade operably associated with said body.

15. The device as in claim 1:
    wherein said body comprises a member for insertion into the small intestines;
    wherein one of said scraping members comprises a rib extending outwardly from the member.

16. The device as in claim 1:
    wherein said body defines a planar surface thereof and includes a plate having an edge and a roll juxtaposed with the plate;
    wherein said edge of the plate defines one of said scraping members and wherein the other of said scraping members comprises a rib formed on a cylindrical member in juxtaposition with said body.

17. The device as in claim 1, further comprising at least one of:
    a spring; and
    a winding spool.

18. The device as in claim 1, further comprising means for applying fluid to the small intestines.

19. The device as in claim 18, wherein said means for applying fluid to the small intestines comprises a cylindrical member operably associated with said body, said cylindrical member defining a conduit therein for passage of a fluid therethrough.

20. A device for preparing small intestines of a vertebrae, said device comprising:
   a body for cooperation with the small intestines, said body defining an external periphery thereof;
   means for longitudinally slitting the small intestines operably associated with said body, wherein said means for longitudinally slitting the small intestine comprises a cutting tool;
   a scraper for scraping the small intestines in juxtaposition with said body; and
   means for flattening the small intestines.

21. The device as in claim 20, wherein said means for flattening the small intestines comprises a biased flattening member juxtapositioned with respect to the exterior periphery of said body, said flattening member adapted to flatten the small intestines.

22. The device as in claim 20:
   wherein said body defines a planar surface thereof; and
   wherein said means for flattening the small intestines comprises a biased flattening member in juxtaposition with said body.

23. A device for removing SIS from the small intestines of a mammal, said device comprising:
   a body for cooperation with the small intestines, said body defining a surface thereof;
   a cylindrical member in juxtaposition with said body and adapted for at least partial insertion into the small intestines;
   means for longitudinally slitting the small intestines operably associated with at least one of said cylindrical member and said body; and
   a rib formed on said cylindrical member.

24. The device as in claim 23 further comprising a plate having an edge, said plate being associated with said body and spaced from said cylindrical member.

25. The device as in claim 23, wherein said cylindrical member defines a longitudinal axis thereof, said longitudinal axis intersecting said surface at an angle of from about 5 to 35 degrees.

26. The device as in claim 23, further comprising means for applying fluid to the small intestines.

27. The device as in claim 26, wherein said means for applying fluid to the small intestines comprises a conduit adapted for passage of a fluid there through, said conduit formed in said cylindrical member.

28. The device as in claim 23, wherein said means for longitudinally slitting the small intestines extends from the periphery of said cylindrical member.

29. The device as in claim 23:
   wherein said means for longitudinally slitting the small intestines comprises a cutting tool;
   wherein said cutting tool comprises a blade defining cutting edge having a longitudinal axis thereof; and
   wherein said body has a longitudinal axis thereof, the longitudinal axis of said body and of said cutting tool being parallel to each other.

30. The device as in claim 23 further comprising a roll biased for proximate positioning with the surface of said body.

31. The device as in claim 23, further comprising at least one of:
   a spring; and
   a winding spool.

32. The device as in claim 23, wherein said cylindrical member defines a longitudinal axis thereof, said longitudinal axis intersecting said surface at an angle of from about 5 to 35 degrees.

33. The device as in claim 1 wherein one of said scraping members comprises a roll operably associated with said body.

34. The device as in claim 33 wherein said body comprises a member for insertion into the small intestines and wherein the other of said scraping members comprises a rib extending outwardly from the member.

35. The device as in claim 34 wherein said member for insertion into the small intestines includes a plurality of ribs.

36. The device as in claim 1 further comprising a means for washing the small intestines.

37. The device as in claim 1 further comprising means for flattening the small intestines.

38. The device as in claim 4 further comprising means for flattening the small intestines.

39. The device as in claim 6 further comprising means for flattening the small intestines.

40. The device as in claim 8 further comprising means for flattening the small intestines.

41. The device as in claim 12 further comprising means for flattening the small intestines.

42. The device as in claim 23 further comprising means for flattening the small intestines.

* * * * *